US 9,253,621 B2

United States Patent
Foti et al.

(10) Patent No.: US 9,253,621 B2
(45) Date of Patent: Feb. 2, 2016

(54) METHOD AND APPARATUS FOR ASSOCIATING SERVICE PROVIDER NETWORK IDENTIFIERS WITH ACCESS NETWORK IDENTIFIERS

(71) Applicant: Telefonaktiebolaget L M Ericsson (publ), Stockholm (SE)

(72) Inventors: George Foti, Dollard des Ormeaux (CA); Peter Hedman, Helsingborg (SE); Juan Antonio Sanchez Herrero, Madrid (ES); Maria Esther Bas Sanchez, Madrid (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 347 days.

(21) Appl. No.: 13/788,830

(22) Filed: Mar. 7, 2013

(65) Prior Publication Data
US 2013/0310027 A1    Nov. 21, 2013

Related U.S. Application Data

(60) Provisional application No. 61/666,193, filed on Jun. 29, 2012, provisional application No. 61/648,891, filed on May 18, 2012.

(51) Int. Cl.
*H04W 4/00*   (2009.01)
*H04W 8/02*   (2009.01)
(Continued)

(52) U.S. Cl.
CPC .............. *H04W 8/02* (2013.01); *H04L 61/106* (2013.01); *H04W 4/005* (2013.01); *H04W 8/10* (2013.01); *H04W 76/021* (2013.01); *H04W 8/26* (2013.01); *H04W 76/022* (2013.01)

(58) Field of Classification Search
CPC .. H04L 61/106; H04W 4/005; H04W 76/021; H04W 76/022; H04W 8/02; H04W 8/10; H04W 8/26
USPC .......... 455/68, 432.1, 410, 411, 432.3, 435.1, 455/435.2; 370/328
See application file for complete search history.

(56) References Cited

U.S. PATENT DOCUMENTS 5,678,179 A * 10/1997 Turcotte et al. ............... 455/466
8,854,960 B2    10/2014 Jain et al.
(Continued)

FOREIGN PATENT DOCUMENTS

WO    2009103623 A2    8/2009
WO    2011062841 A1    5/2011
(Continued)

OTHER PUBLICATIONS
Erricsson, M2M Service Enablement, Mar. 9, 2012.*
(Continued)

*Primary Examiner* — Jean Gelin
(74) *Attorney, Agent, or Firm* — Murphy, Bilak & Homiller, PLLC

(57) ABSTRACT

According to one aspect of the teachings herein, a token is logically bound to an external identifier and provided to a wireless device via triggering signaling sent to the wireless device through an access network. The wireless device is configured to send registration signaling through the access network to a service provider network, in response to the triggering signaling and to return the token in such signaling. With this advantageous approach, the service provider network recognizes the token returned from the wireless device and thereby learns the association between a service provider network identifier that is received in the registration signaling for identifying the wireless device with respect to a service provided by the service provider network, and an external identifier assigned by the access network for use by the service provider network in identifying the wireless device to the access network.

53 Claims, 12 Drawing Sheets

(51) Int. Cl.
*H04L 29/12* (2006.01)
*H04W 8/10* (2009.01)
*H04W 76/02* (2009.01)
*H04W 8/26* (2009.01)

(56) References Cited

U.S. PATENT DOCUMENTS

| | | |
|---|---|---|
| 8,953,508 B2 | 2/2015 | Zheng et al. |
| 2009/0023443 A1 | 1/2009 | Kieselmann et al. |
| 2009/0129263 A1 | 5/2009 | Osborn et al. |
| 2010/0008259 A1 | 1/2010 | Yoon et al. |
| 2011/0125925 A1 | 5/2011 | Bouthemy et al. |
| 2011/0128911 A1 | 6/2011 | Shaheen |
| 2011/0164107 A1 | 7/2011 | Tian et al. |
| 2011/0207491 A1 | 8/2011 | Swaminathan et al. |
| 2012/0042073 A1 | 2/2012 | Lassborn et al. |
| 2012/0257571 A1 | 10/2012 | Liao et al. |
| 2012/0265983 A1 | 10/2012 | Yegin et al. |
| 2012/0302229 A1 | 11/2012 | Rönneke |
| 2013/0016657 A1 | 1/2013 | Muhanna et al. |
| 2013/0017827 A1 | 1/2013 | Muhanna et al. |
| 2013/0142118 A1 | 6/2013 | Cherian et al. |
| 2013/0188515 A1 | 7/2013 | Pinheiro et al. |
| 2013/0196630 A1 | 8/2013 | Ungvari et al. |
| 2013/0203412 A1 | 8/2013 | Starsinic et al. |
| 2013/0212236 A1 | 8/2013 | Foti et al. |
| 2013/0273855 A1* | 10/2013 | Cherian et al. .............. 455/68 |
| 2013/0279373 A1 | 10/2013 | Ding et al. |
| 2013/0297744 A1 | 11/2013 | Foti |
| 2013/0310027 A1 | 11/2013 | Foti et al. |
| 2013/0315155 A1 | 11/2013 | Foti et al. |
| 2013/0318218 A1 | 11/2013 | Foti et al. |
| 2013/0332627 A1 | 12/2013 | Skog et al. |
| 2014/0086143 A1 | 3/2014 | Foti et al. |
| 2014/0086144 A1 | 3/2014 | Foti et al. |
| 2014/0089442 A1 | 3/2014 | Kim et al. |
| 2014/0128113 A1 | 5/2014 | Zisimopoulos et al. |
| 2014/0185522 A1 | 7/2014 | Xu et al. |
| 2014/0219182 A1 | 8/2014 | Chandramouli et al. |
| 2014/0286237 A1 | 9/2014 | Bhalla |
| 2015/0045074 A1 | 2/2015 | Wong et al. |

FOREIGN PATENT DOCUMENTS

| | | |
|---|---|---|
| WO | 2011098150 A1 | 8/2011 |
| WO | 2012142618 A2 | 10/2012 |
| WO | 2013115946 A1 | 8/2013 |

OTHER PUBLICATIONS

Third Generation Partnership Project, "3GPP TS 23.682 V11.0.0 (Mar. 2012)," 3rd Generation Partnership Project; Technical Specification Group Services and System Aspects; Architecture enhancements to facilitate communications with packet data networks and applications (Release 11). Mar. 2012. pp. 1-24.

Third Generation Partnership Project, "3GPP TS 23.682 V11.3.0 (Dec. 2012)," 3rd Generation Partnership Project; Technical Specification Group Services and System Aspects; Architecture enhancements to facilitate communications with packet data networks and applications (Release 11). Dec. 2012. pp. 1-29.

Author Unknown, "ETSI TS 102 690 V2.0.1 (Dec. 2011)," ETSI. Technical Specification. Machine-to-Machine Communications (M2M); Functional Architecture. Dec. 2011. pp. 1-238.

Author Unknown, "Liaison Statement Answer to 3GPP SA2 on MTC Identification Aspects," ETSI TC M2M. 3GPP TSG-SA WG1 Meeting #55; S1-112213; M2M(11)0519r3. Aug. 8-12, 2011. pp. 1-2. Dublin, Ireland.

3rd Generation Partnership Project, "3GPP TS 23.682 V11.1.0 (Jun. 2012)," 3rd Generation Partnership Project; Technical Specification Group Services and System Aspects; Architecture enhancements to facilitate communications with packet data networks and applications (Release 11). Jun. 2012. pp. 1-27.

3rd Generation Partnership Project, "3GPP TR 23.888 V1.6.1 (Feb. 2012)," 3rd Generation Partnership Project; Technical Specification Group Services and System Aspects; System Improvements for Machine-Type Communications (Release 11). Feb. 2012. pp. 1-165.

Author Unknown, "M2M Service Enablement," Telefon AB LM Ericsson; M2M(12)19-076. ETSI. Mar. 8, 2012. pp. 1-10.

Author Unknown, "Mapping aspects for ETSI M2M architecture," Ericsson, ST-Ericsson; SA WG2 Temporary Documents; 3GPP TSG SA WG2 Meeting #85; TD S2-112291; May 16-20, 2011. pp. 1-11. Xi'an, China.

European Telecommunications Standards Institute. "Machine-to-Machine communications(M2M); Functional architecture." ETSI Technical Committee Machine-to Machine Communications (M2M),Technical Specification, ETSI TS 102 690 V1.1.9, Sep. 2012, pp. 1-280.

Unknown, Author, "Machine-to-Machine communications (M2M); Functional architecture", ETSI TS 102 690 V1.1.1, Oct. 2011, 1-280.

* cited by examiner

METHOD AND APPARATUS FOR ASSOCIATING SERVICE PROVIDER NETWORK IDENTIFIERS WITH ACCESS NETWORK IDENTIFIERS

RELATED APPLICATIONS

This application claims priority from the U.S. provisional applications assigned the Application Ser. No. 61/666,193, filed 29 Jun. 2012, and Ser. No. 61/648,891, filed 18 May 2012 and which are incorporated herein by reference.

TECHNICAL FIELD

The present invention generally relates to access networks and service provider networks external to such access networks, and particularly relates to obtaining and using external identifiers for devices connecting to a service provider network through an access network.

BACKGROUND

In an environment in which Machine-to-Machine (M2M) devices are connected to an M2M service provider (SP) through an access network provided by another entity, the M2M service provider effectively creates a service layer on top of the access network. This service layer is used to deliver services to the M2M devices, but it will be understood that to identify devices on the network there is a requirement for one or more identities on this access network to provide this service. In the European Telecommunications Standards Institute (ETSI) M2M framework, the M2M SP interworks with the access network, for the M2M devices that have subscribed to the services provided by the M2M SP. This interworking is typically performed using an external identifier selected for that purpose. Other available identifiers include the Mobile Station International Subscriber Directory Number (MSISDN), the Internet Protocol Multimedia Public Identity (IMPU), etc. The external identifier is typically allocated by the access network for the M2M device. The external identifier is used for interworking purposes between the access network and the service provider network. Use of the external identifier means that the access network does not have to share the IMSI or other internal identifier, which is typically reserved for use as an access network private identity, and which is not used on external (public) interfaces, such as the interface with the service provider network.

The external identifier is defined in the Third Generation Partnership Project (3GPP) R11 standards. As defined, the external identifier is associated only with MTC Device triggering procedures. However, the 3GPP specification does not describe how external networks can acquire the external identifier of a given M2M device for interworking purposes. Furthermore, the M2M ETSI standard does not consider the use of the MTC Device triggering procedure and the mechanism to acquire external identifiers from an access network, for triggering targeted M2M devices via the access network.

SUMMARY

According to one aspect of the teachings herein, a token is logically bound to an external identifier and provided to a wireless device via triggering signaling sent to the wireless device through an access network. The wireless device is configured to send registration signaling through the access network to a service provider network, in response to the triggering signaling and to return the token in such signaling.

With this advantageous approach, the service provider network recognizes the token returned from the wireless device and thereby learns the association between a service provider network identifier that is received in the registration signaling for identifying the wireless device with respect to a service provided by the service provider network, and an external identifier assigned by the access network for use by the service provider network in identifying the wireless device to the access network.

With the above in mind, an example network node is configured for operation in association with the service provider network and is configured to implement a first method that includes receiving an external identifier that has been assigned by an access network for externally identifying a wireless device. Here, it is noted that the wireless device also has a predefined service provider network identifier for using a service provided by the service provider network. In a particular example, the wireless device has subscription credentials for accessing the access network, which include or are related to an access network identifier used internally by the access network to identify the wireless device. The wireless device further has subscription credentials or other information to be used for registering for the service, and the service provider network identifier identifies the wireless device for such purposes.

However, while the access network knows the mapping between the access network identifier and the external identifier, the service provider network does not initially know which service provider network identifier is associated with the external identifier. Hence, the first method includes the service provider network node triggering the wireless device to establish a data session with the access network for use in registering for the service with the service provider network. This operation is based on the node sending triggering signaling toward the access network that identifies the wireless device via the external identifier and includes a token for forwarding to the wireless device. The token is logically bound to the external identifier and this binding is established by, or at least known by, the service provider network.

Correspondingly, the first method further includes receiving registration signaling sent from the wireless device via the access network, where the registration signaling is sent responsive to the triggering signaling sent from the service provider network node. The registration signaling from the triggered M2M device includes the service provider network identifier of the wireless device and the token. Because the service provider network knows the external identifier used to trigger the registration signaling, it uses the token received in the registration signaling from the wireless device to learn the association between the service provider network identifier of the device, which is used for identifying the device with respect to the service, and the external identifier, which is bound to the token and assigned by the access network. By using the token to learn the linkage between the service provider network identifier of an M2M device and the external identifier of that device, the service provider network obtains the information needed for interworking. That is, the service provider network knows which external identifier to use for triggering subsequent communication toward the M2M device via the access network.

Thus, the first method further includes, responsive to recognizing that the registration signaling includes the forwarded token, binding the external identifier of the wireless device to the service provider network identifier of the wireless device. Such binding establishes a mapping between the external identifier and the service provider network identifier, for subsequent use by the service provider network in triggering communications with the wireless device through the access network.

In a corresponding embodiment, another node operates in communicative coupling with the above-mentioned service provider network node, e.g., for receiving the triggering signaling and forwarding the token to the wireless device. This node, for example, implements an interworking function (IWF) between the access network and the service provider network, and is configured to implement a second method that is complementary to the first method. In an example arrangement, the second method includes the IWF receiving an external identifier and an associated token in first triggering signaling that is sent from the service provider network to the IWF, to trigger communication with a wireless device, as identified by the external identifier.

The second method further includes obtaining an access network identifier for the wireless device from the access network, based on submitting the external identifier to a Home Subscriber Server (HSS) or other node in the access network that has access to a defined mapping between the external identifier of the wireless device and the access network identifier that is used internally within the access network to identify the wireless device. The method then continues with sending second triggering signaling toward the wireless device via the access network, to trigger the wireless device to establish a data session with the access network, for sending registration signaling to the service provider network.

The "second" triggering signaling thus will be understood as corresponding to the first triggering signaling originating from the service provider network. However, where the first triggering signaling uses the external identifier to identify the targeted wireless device, the second triggering signaling uses the access network identifier to identify the wireless device. The second triggering signaling does include the token, to thereby enable the wireless device to return the token to the service provider network in the registration signaling, for recognition by the service provider network as matching the token sent in the first triggering signaling.

According to a complementary, third method, an HSS is configured to carry out certain processing with respect to the above first and second methods implemented in the service provider network node and in the IWF node, respectively. In an example case, the method implemented by the HSS includes sending a notification to the IWF, which communicatively couples to the service provider network. The notification indicates an external identifier of a wireless device that has attached to the access network, for registering with the service provider network. As noted, the external identifier is assigned to the wireless device by the access network, for use by the service provider network in identifying the wireless device to the access network.

The third method further includes subsequently receiving signaling sent from the IWF responsive to the service provider network triggering communication with the wireless device via the access network, for registration of the wireless device with the service provider network. This operation can be understood as the HSS receiving signaling from the IWF in response to the IWF receiving the aforementioned first triggering signaling from the service provider network. The signaling received from the IWF includes the external identifier of the wireless device and the third method includes the HSS responding to that signaling by mapping the external identifier to the access network identifier of the wireless device, e.g., the International Mobile Subscriber Identity (IMSI) of the wireless device.

Further, the third method includes the HSS returning in the IMSI or other form of access network identifier to the IWF, for use in triggering the communication with the wireless device. Performance of the third method at the HSS thereby provides the IWF with the information it needs to generate the aforementioned second triggering signaling, using the IMSI or other such access network identifier in such signaling to target the same wireless device identified via the external identifier in the first triggering signaling, as originated from the service provider network.

As for use of the token at the targeted wireless device, i.e., the device to be registered for a service provided by the service provider network, it was noted in the above example embodiment of the second method that the IWF forwarded the token to the wireless device in the second triggering signaling, sent toward the wireless device in the access network via use of the access network identifier of the wireless device. Thus, in another embodiment of the teachings herein, a wireless device is configured to implement a fourth method.

An example of this fourth method includes receiving device trigger signaling from the access network that is directed to the wireless device via an access network identifier used by the access network to identify the wireless device internally within the access network—e.g., the wireless device receives the aforementioned second triggering signaling as sent from the IWF that communicatively couples the service provider network to the access network. The device trigger signaling received at the wireless device includes a token, and is sent to the wireless device in response to the access network receiving corresponding trigger signaling from the service provider network—e.g., the first triggering signaling. The triggering signaling from the service provider network identifies the wireless device via an external identifier that is bound to the token in the service provider network. As before, the external identifier has been assigned by the access network for use by the service provider network in identifying the wireless device to the access network.

The fourth method includes, in response to receiving the device trigger signaling, the wireless device establishing a data session with the access network, for registering for a service with the service provider network, and sending registration signaling to the service provider network via the data session. Advantageously, the registration signaling indicates a service provider network identifier that identifies the wireless device with respect to the service for which the device is registering and returns the token. Returning the same token that was provided by the service provider network in the triggering signaling that ultimately prompted the device's registration enables the service provider network to recognize the returned token and thereby bind the service provider network identifier of the wireless device to the external identifier of the wireless device.

In other words, there is a wireless device that is configured with subscription credentials or other such data enabling the device to register for a given service—e.g., a Machine-to-Machine or M2M service—with the service provider network. The service provider network is provided with an external identifier for the wireless device upon, e.g., initial attachment of the wireless device to the access network through which the wireless device will register with the service provider network. However, the service provider network does not know the service provider network identifier of the wireless device represented by the external identifier.

Thus, the service provider network triggers registration by the wireless device, based on sending triggering signaling to the access network that includes the external identifier and a token that is uniquely paired with the external identifier (bound to it). The involved nodes in the access network, e.g., an appropriately configured IWF and HSS, map the external identifier to the IMSI or other access network identifier of the wireless device, and send corresponding triggering signaling to the wireless device, where that corresponding triggering signaling uses the IMSI or other access network identifier to target the wireless device and includes the token.

In turn, the wireless device is configured to respond to the triggering signaling sent by the access network by establishing a data session with the access network and using that data session to send registration signaling to the service provider network—e.g., to perform ETSI Bootstrapping and ETSI Registration for registration of an M2M application on the wireless device with an M2M service provider network. By returning in that registration signaling the same token that was used in the original triggering signaling from the service provider network, the service provider network can definitively link the external identifier of the wireless device to the service provider network identifier of the wireless device, so that the external identifier can be used to trigger subsequent communications with the device involving that service provider network identifier.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
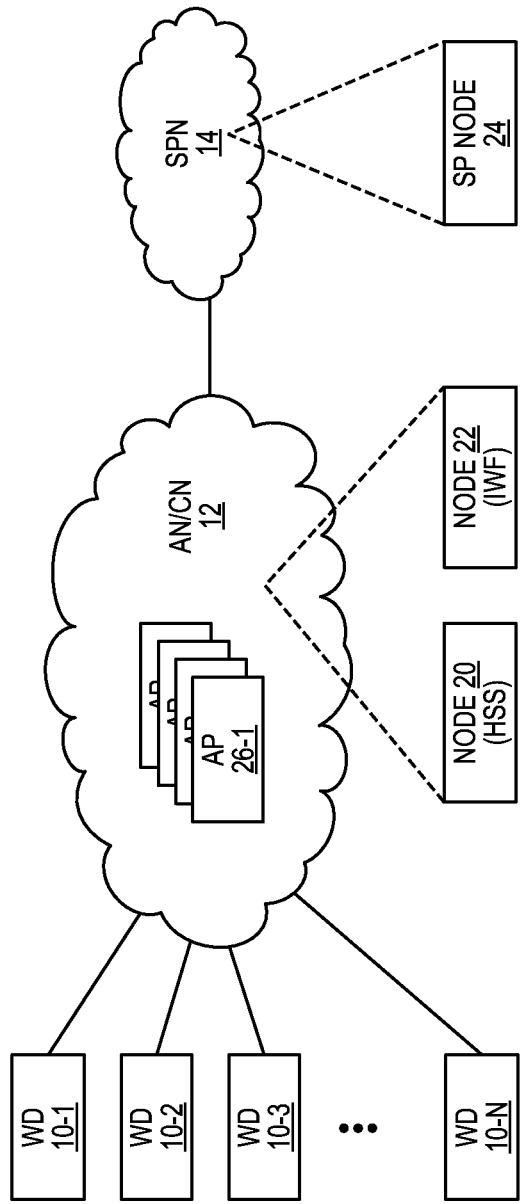
FIG. 1 is a block diagram of example access and service provider networks and associated wireless devices, according to one or more embodiments taught herein.

FIG. 1 illustrates a plurality of wireless devices 10, which are individually referenced as device 10-1, 10-2, and so on, when needed for clarity, and are otherwise referred to generically as "wireless devices 10" in the plural sense and as "wireless device 10" in the singular sense. While connectivity between the wireless devices 10 and an access network 12 is suggested in the diagram, it will be appreciated that not all of the wireless devices 10 are necessarily in operation or connected to the access network 12 at any given instant in time. Note that in the diagram, the access network 12 is abbreviated as "AN/CN 12" merely to connote that there generally are Core Network (CN) entities of interest herein. These entities are discussed later herein.

For now, it should be understood that each wireless device 10 is configured for communication with the access network 12, and for communication with a service provider network 14, which is accessible to the wireless device 10 via the access network 12. In an example case, the access network 12 comprises a Third Generation Partnership Project (3GPP) access network, such as a WCDMA- or LTE-based cellular data network, or a CDMA or HRPD network. Each wireless device 10 comprises a User Equipment or UE, which includes a 3GPP-based radio modem or other such transceiver circuitry for communicating with the 3GPP network. More broadly, the wireless device 10 includes a communication transceiver for communicating with the access network, which may be essentially any type of network usable for connecting to the service provider network 14, and includes processing circuitry configured for the appropriate protocols and signaling with respect to both such networks.

In more detail, the wireless device 10 is configured or otherwise provisioned with subscription credentials or other such authentication information as needed to attach to and establish a data session with the access network 12, and as needed for registering for a service provided by the service provider network 14, and communicating with the service provider network 14 in the context of that service. In a non-limiting example, the wireless device 10 hosts a Machine-Type-Communication (MTC) application that is subscribed to a Machine-to-Machine (M2M) service provided in the service provider network 14 operating as an M2M network.

Thus, in initializing or otherwise initially registering the MTC application, the wireless device 10 would attach to the access network 12, establish a data session with the access network 12 for communicating with the service provider network 14, and then use that data session to register the MTC application in the M2M network. According to the advantageous teachings herein, various nodes in the access network 12 and in the service provider network 14 are configured to facilitate that initial registration in a manner that allows the service provider network 14 to bind a service provider network identifier used by the service provider network 14 to identify the wireless device 10 with respect to a service provided by the service provider network 14, and an external identifier that is assigned by the access network 12 to the wireless device 10, for used by the service provider network 14 in identifying the wireless device 10 to the access network 12.

As those of ordinary skill in the art will appreciate, use of the external identifier allows the access network 12 to keep private the International Mobile Subscriber Identity (IMSI) or other such access network identifier of the wireless device 10. That is, the access network 12 does not provide the access network identifier of the wireless device 10 to the service provider network 14 and instead provides an external identifier that has been logically bound to the access network identifier within the access network 12.

In this manner, the IMSI or other sensitive access network identifier of the wireless device 10 is not compromised by releasing it to the external service provider network 14. However, the external identifier itself has no predefined meaning within the service provider network 14, because the service provider network 14 uses a service provider network identifier—e.g., an identifier embedded in service credentials provisioned within the wireless device 10—to identify the wireless device 10. Consequently, without more, simply receiving an external identifier from the access network 12 is of little value to the service provider network 14 because it does not know in advance which one of the plurality of wireless devices 10 has been assigned to the external identifier by the access network 12.

In this regard, these detailed teachings disclose advantageous example configurations for a Home Subscriber Server (HSS, as represented by the node 20), an interworking function (IWF, as represented by the node 22), a service provider network node 24, and the wireless device 10, which uses an access point 26-1, 26-2, and so on, in the access network 12 to access the service provider network 14. More particularly, these detailed teachings disclose example operations at these respective nodes and at the wireless device 10, which provide for an automatic and secure association between the service provider network identifier assigned in the service provider network 14 to any given one among a plurality of wireless devices 10, and the external identifier assigned to that wireless device 10 by the access network 12.

Figure 2:
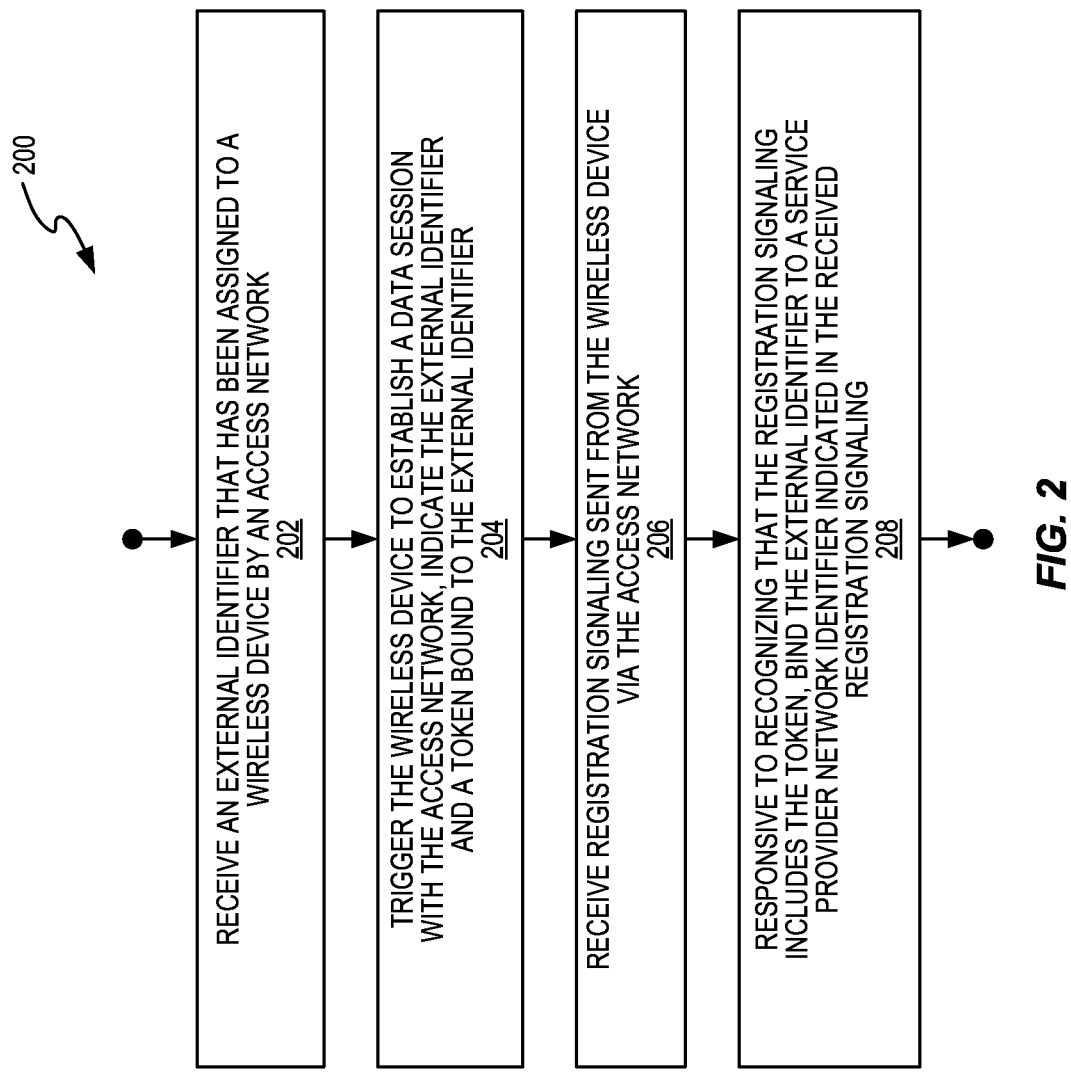
FIG. 2 is a logic flow diagram of one embodiment of a method of processing at a service provider network node.

For example, FIG. 2 illustrates one embodiment of a method 200 performed by the network node 24 that is associated with a service provider network 14. The method 200 includes receiving (Block 202) an external identifier that has been assigned by the access network 12 for externally identifying a wireless device 10 that also has a predefined service provider network identifier for using a service provided by the service provider network 14. At this point, the particular wireless device 10 that is identified by the external identifier is not known to the service provider network 14.

The method 200 further includes the node 24 triggering (Block 204) the wireless device 10 to establish a data session with the access network 12, for use in registering for the service with the service provider network 14. Such triggering is based on the node 24 sending triggering signaling toward the access network 12 that identifies the wireless device 10 via the external identifier. Advantageously, the method 200 further includes sending in the triggering signaling a token for forwarding to the wireless device 10.

As a consequence of sending the triggering signaling, the wireless device 10 establishes a data session with the access network 12 and sends registration signaling towards the service provider network 14. Thus, the method 200 further includes receiving (206) registration signaling sent from the wireless device via the access network 12, which, as noted, is sent in response to the triggering signaling sent from the service provider network 14—i.e., from the node 24.

The method 200 continues at the node 24 with, in response to recognizing that the registration signaling includes the forwarded token, binding (208) the external identifier of the wireless device 10 to the service provider network identifier of the wireless device 10. In performing this binding, the node 24 thereby establishes a mapping between the external identifier and the service provider network identifier, for subsequent use by the service provider network 14 in triggering communications with the wireless device 10 through the access network 12.

Figure 3:
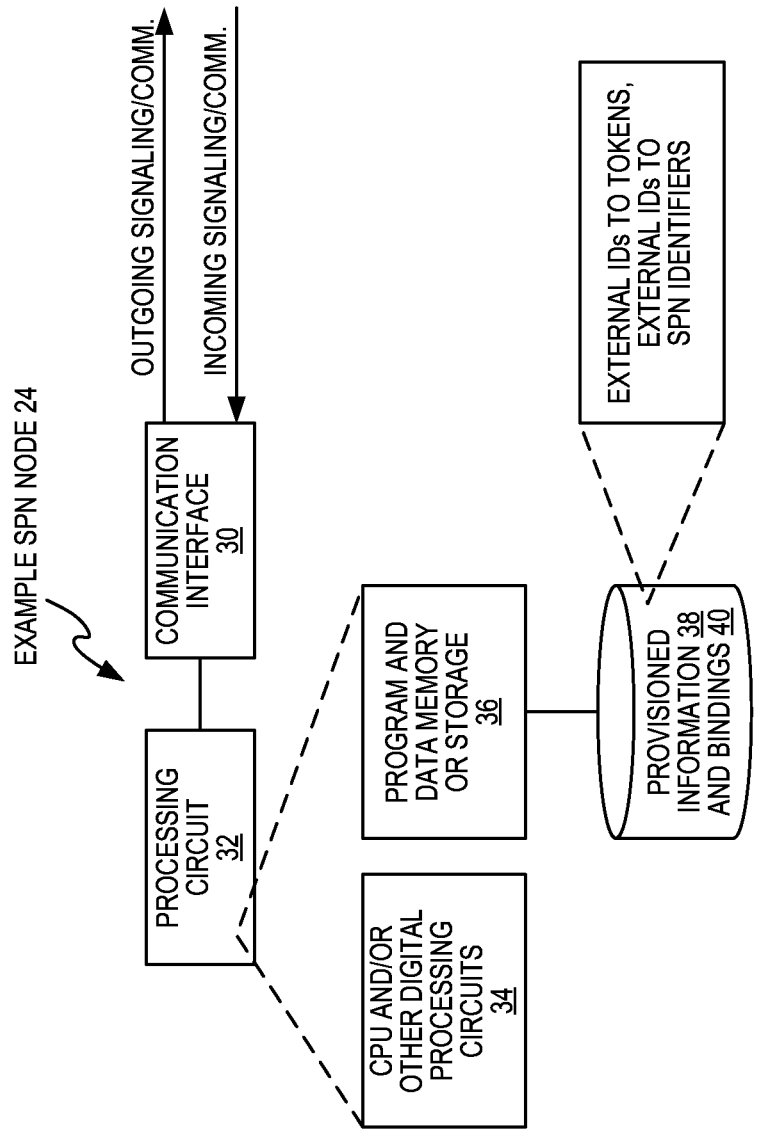
FIG. 3 is a block diagram of one embodiment of a service provider network node configured to perform the method of FIG. 2, for example.

FIG. 3 illustrates an example configuration of the network node 24, which is configured to perform the method 200, for example. The node 24 includes a communication interface 30 for communicating with the access network 12 and for communicating with the wireless device 10 via signaling conveyed through the access network 12. Thus, the communication interface 30 may comprise more than one interface circuit, or at least may comprise processing circuitry that is configured to implement protocols for communicating with on more nodes associated with the access network 12, and for communicating with the wireless device 10 via that access network 12.

The node 24 further includes a processing circuit 32 that is configured to: receive an external identifier that has been assigned by the access network 12, for externally identifying a wireless device 10 that also has a predefined service provider network identifier for using a service provided by the service provider network 14; and to trigger the wireless device 10 to establish a data session with the access network 12, for use in registering for the service with the service provider network 14. The processing circuit 32 effects such triggering based on being configured to send triggering signaling toward the access network 12 that identifies the wireless device 10 via the external identifier and includes a token for forwarding to the wireless device 10.

The token will be understood as comprising a numeric or other value or data object that is at least temporarily associated on a unique basis with the external identifier of the wireless device 10 according to a one-to-one pairing. The node 24 stores or otherwise maintains a link or other data representing the unique pairing of the token to the external identifier and the token therefore is "bound" to the external identifier of the wireless device 10.

Correspondingly, the processing circuit 32 is configured to receive registration signaling sent from the wireless device 10 via the access network 12, where that registration signaling is sent responsive to the triggering signaling originally sent from the node 24. Further, responsive to recognizing that the registration signaling from the wireless device 10 includes the forwarded token—i.e., the same token as was included in the original triggering signaling sent from the node 24—the processing circuit 32 is configured to bind the external identifier of the wireless device 10 to the service provider network identifier of the wireless device 10. Here, "bind" means to map, link or otherwise logically associate, such as by storing the external identifier and the service provider network identifier together, or by storing a pointer or other data that indicates the pairing.

By performing this binding, the processing circuit 32 thereby establishes a mapping between the external identifier and the service provider network identifier, for subsequent use by the service provider network 14 in triggering communications with the wireless device 10 through the access network 12. For example, it may be that the node 24 needs to send a service-related message to the wireless device 10. The service identifies the wireless device 10 in terms of the service provider network identifier of the wireless device 10, but for sending the message to the wireless device 10 via the access network 12, the node 24 uses the external identifier bound to the service provider network identifier.

In some embodiments, the processing circuit 32 is configured to receive a notification from the access network 12 that indicates the external identifier and indicates that the wireless device 10 has attached to the access network 12. For example, assuming that a plurality of wireless devices 10 are configured to use a service provided by the service provider network 14, each such device will initially need to attach to the access network 12, establish a data session with the access network 12, and use that data session to register with the service provider network 14 for the service.

Thus, the access network 12 is configured in this example case to send notifications to the service provider network 14, each notification indicating that a given one of the wireless devices 10 has initially attached to the access network 12, and identifying the attaching wireless device 10 by the external identifier assigned to the wireless device 10 by the access network 12. In at least some embodiments, the service provider network node 24 is configured to send a subscription request to the access network 12—e.g., to an interworking function that couples the service provider network 14 with the access network 12—and it is the receipt and processing of this subscription request that configures the access network 12 to provide the above-described notifications to the service provider network 14. It will be understood that the processing circuit 32 thus may be configured to subscribe to the access network 12 for such notifications.

In some embodiments, the processing circuit 32 is configured to receive a list of external identifiers in advance of receiving the notification. In one or more such embodiments, the notification includes an index or pointer that identifies the external identifier from among the external identifiers in the list.

For example, a range of external identifiers may be pre-allocated or pre-associated with the service provider network 14. The list corresponds to a potentially large plurality of wireless devices 10 that are associated with the service provider network 14—e.g., that have one or more applications credentialed for subscribing to a service provided by the service provider network 14. By sending such a list in advance of sending attachment notifications for the involved wireless devices 10, the notification sent in response to a given wireless device 10 attaching to the access network 12 can include a simple pointer to the external identifier, which may be smaller or otherwise more efficiently signaled than the actual external identifier.

In some embodiments, the token to be used for a given wireless device 10 is generated or otherwise controlled by the access network 12 and the processing circuit 32 is configured to receive the token, along with the external identifier, in the notification sent from the access network 12. Alternatively, in some embodiments, the processing circuit 32 is configured to generate the token for a given wireless device 10, in response to receiving the notification from the access network 12, indicating that the given wireless device 10 has attached to the access network 12. Thus, node 24 receives the external identifier in that notification, generates the token, and binds the generated token to the received external identifier.

Regardless of such variations, in one or more embodiments, the processing circuit 32 is configured to: subsequently identify the wireless device 10 for a communication related to the service, based on the service provider network identifier of the wireless device 10; map the service provider network identifier to the external identifier, as bound to the service provider network identifier; and send the communication toward the wireless device 10 via the access network 12. Here, it will be understood that the communication outgoing from the node 24 uses the external identifier to identify the wireless device 10 to the access network 12.

In some embodiments, the processing circuit 32 is configured to identify the access network 12 from provisioned information stored in the network node 24. For example, with respect to such processing and/or any of the above processing described for the example node 24, the processing circuit 32 may comprise one or more CPUs and/or other digital processing circuits 34, which include or are associated with a computer-readable medium, such as program and data memory or other such storage 36. The storage 36 may comprise more than one memory device or other storage element, such as DRAM operating as working memory and FLASH or other non-volatile storage serving as program memory.

The non-volatile storage holds provisioned information 38 and may hold bindings 40, representing the mapping between one or more external identifiers and respective ones of one or more service provider network identifiers. For example, the provisioned information 38 may comprise information identifying the access network 12 and/or particularly identifying the IWF to be used for communicating with the access network 12.

In any case, the storage 36 in an example configuration stores a computer program comprising computer program instructions. The processing circuit 32 is configured to carry out the processing disclosed herein for the node 24 based at least partially on its execution of the stored computer program instructions, e.g., to carry out the method 200 as described above and/or variations thereof.

Regardless of the particular configuration of its processing circuitry, the service provider network 14 in an example case comprises a Machine Type Communications (MTC) network. In this case, the service provided by the service provider network 14 comprises a MTC service, and the wireless device 10 hosts an MTC application that is authorized to communicate with the MTC service according to a defined subscription agreement, and according to which the wireless device 10 is identified by a Services Capability Layer Identifier (SCL-ID). That is, the SCL-ID represents the service provider network identifier referred to in the foregoing discussion. Here, the processing circuit 32 is configured to bind the external identifier to the SCL-ID of the wireless device 10. As such, later service-related communications directed to the SCL-ID may be mapped to the bound external identifier, for use in identifying the wireless device 10 in messaging sent toward the access network 12.

In the same or other embodiments, the processing circuit 32 is configured to receive a Device/Gateway Services Capability Layer identity (G/DSCL-ID) in the registration signaling sent from a wireless device 10, and bind the external identifier to the G/DSCL-ID, for subsequent use in directing MTC service communications to the wireless device 10 via the access network 12.

Figure 4:
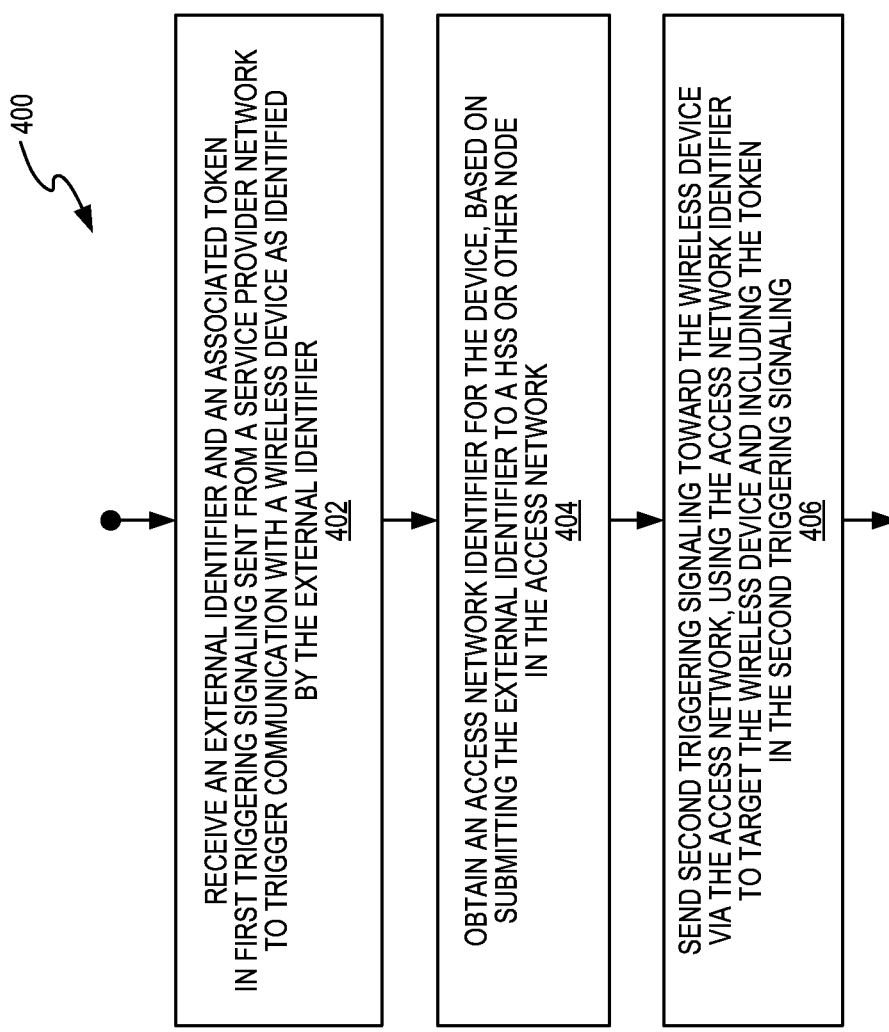
FIG. 4 is a logic flow diagram of one embodiment of a method of processing at a node configured to provide an interworking function (IWF) between an access network and a service provider network.

Of course, it will be understood that the operations at the node 24 in the service provider network 14 are complemented by corresponding, complementary operations at the IWF (implemented in the node 22 introduced in FIG. 1). FIG. 4 illustrates one embodiment of a method 400 implemented at the node 22 (via the IWF), for providing such complementary operation in the access network 12.

The method 400 includes receiving (Block 402) an external identifier and an associated token in first triggering signaling sent from the service provider network 14 to the network node 22, to trigger communication with a wireless device 10 as identified by the external identifier. The method 400 further includes obtaining (Block 404) an access network identifier for the wireless device 10 from the access network 12, based on submitting the external identifier to the HSS 20 or other node in the access network 12 that has access to a defined mapping between the external identifier of the wireless device 10 and the IMSI or other such access network identifier of the wireless device 10.

Still further, the method 400 includes sending (Block 406) second triggering signaling toward the wireless device 10 via the access network 12, to trigger the wireless device 10 to establish a data session with the access network 12 for sending registration signaling to the service provider network 14. Sending the second triggering signaling can be understood in some sense as forwarding the first triggering signaling to the wireless device 10. However, whereas the first triggering signaling identified the wireless device 10 via the external identifier allocated to that wireless device 10, the second triggering signaling uses the access network identifier to identify the wireless device 10, and it includes the token.

Sending the token to the wireless device 10 in the second triggering signaling enables the wireless device 10 to return the token to the service provider network 14 in the registration signaling sent from the wireless device 10, for recognition by the service provider network 14 as matching the token sent in the first triggering signaling. Such recognition provides the basis for the service provider network 14 in correctly establishing the relationship between the external identifier of the wireless device 10 and the service provider network identifier of the wireless device 10.

Figure 5:
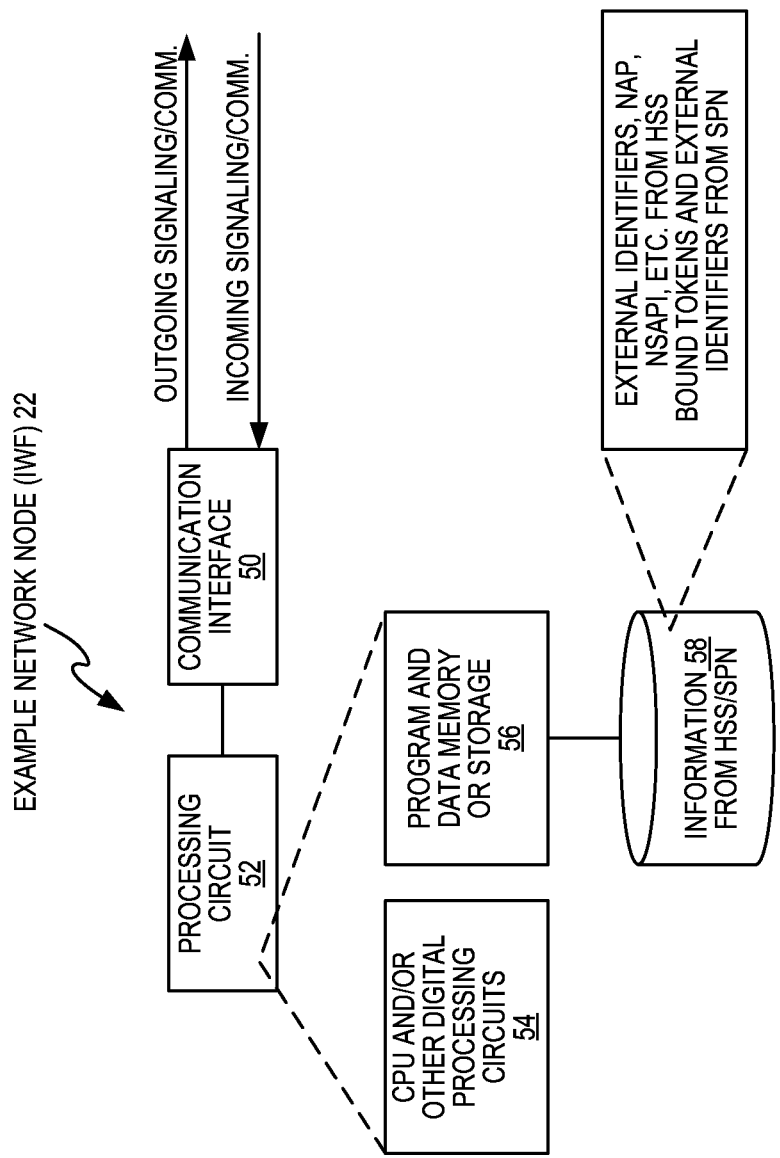
FIG. 5 is a block diagram of one embodiment of an IWF node configured to perform the method of FIG. 4, for example.

Thus, in one or more embodiments, the network node 22 is configured to implement an IWF between an access network 12 and a service provider network 14, such as shown in FIG. 5. In the illustrated example, the network node 22 comprises a communication interface 50 that is configured to send signaling toward and to receive signaling from one or more nodes within an access network 12, e.g., an HSS 20, and to send signaling toward and to receive signaling from one or more nodes within a service provider network 14, e.g., the service provider network node 24. Of course, it will be appreciated that the communication interface 50 may, in fact, comprise more than one interface and/or may implement multiple physical-layer interfaces and/or signaling protocols for communicating within the access network 12, with the service provider network 14, and with wireless devices 10 via the access network 12.

The node 22 implements the IWF based on further including a processing circuit 52 that is operatively associated with the communication interface 50 and configured to receive an external identifier and an associated token in first triggering signaling sent from the service provider network 14 to the network node 22, to trigger communication with a wireless device 10 as identified by the external identifier. The processing circuit 52 is further configured to obtain an access network identifier for the wireless device 10 from the access network 12, based on submitting the external identifier to the HSS 20 or another node in the access network 12 that has access to a defined mapping between the external identifier of the wireless device 10 and the access network identifier of the wireless device 10.

Still further, the processing circuit 52 is configured to send second triggering signaling toward the wireless device 10 via the access network 12, to trigger the wireless device 10 to establish a data session with the access network 12, for sending registration signaling to the service provider network 14. The second triggering signaling uses the access network identifier to identify the wireless device 10 and includes the token received in the first triggering signaling. Including the token in this manner thereby enables the wireless device 10 to return the token to the service provider network 14 in the registration signaling sent from the wireless device 10. In turn, this allows the service provider network 14 to recognize the token received from the wireless device 10 as matching the token originally sent from the service provider network 14 in the first triggering signaling.

In some embodiments, the processing circuit 52 is configured to receive an access point name or identifier for the service provider network 14, in conjunction with obtaining the access network identifier for the wireless device 10. Correspondingly, the processing circuit 52 is configured to send an indication of the access point name or identifier in the second triggering signaling, for use by the wireless device 10 in establishing the bearer with the access network 12 for communication with the service provider network 14, for sending the registration signaling to the service provider network 14.

In some embodiments, the processing circuit 52 is configured to submit the external identifier to the HSS 20 or another node in the access network 12, by sending a request that includes the external identifier, and to receive the access network identifier for the wireless device 10 in return from the HSS 20 or other node. The HSS 20 or other access network node returns the access network identifier for the wireless device 10, based on knowing a defined mapping between the external identifier assigned to the wireless device 10 and the access network identifier associated with the wireless device 10.

In some embodiments, the processing circuit 52 is further configured to: receive a notification from the HSS 20 or other node in the access network 12, which notification indicates the external identifier of the wireless device 10 and is sent in response to the wireless device 10 attaching to the access network 12, for establishing a data session to send the registration signaling to the service provider network 14; forward the notification toward the service provider network 14; and receive the first triggering signaling from the service provider network 14 in response to forwarding the notification.

Still further, in some embodiments, the processing circuit 52 is configured to receive the token in the notification sent from the HSS 20 or other node in the access network 12, and to include the token in the forwarded notification sent to the service provider network 14. Such embodiments apply for the case in which the access network 12 generates or otherwise controls the token, versus the case where the token is generated or otherwise controlled by the service provider network 14.

In some embodiments, the processing circuit 52 is configured to receive a subscription request from the service provider network 14 requesting that notifications be provided to the service provider network 14 responsive to any one among a plurality of wireless devices 10 attaching to the access network 12, for registering with the service provider network 14. Here, this plurality of wireless devices 10 will be understood as comprising a number of wireless devices 10 that have been provisioned for one or more services provided by the service provider network 14, and that have been provisioned for accessing the service provider network 14 via the access network 12. Such an example was introduced in FIG. 1.

Continuing in the context of such embodiments, the processing circuit 52 is configured to forward the subscription request to the HSS 20 or other node in the access network 12, to configure the HSS 20 or other node in the access network to send the notification upon attachment by the wireless device 10. More generally, the subscription request results in the node 22 receiving an attachment notification responsive to any one of the wireless devices 10 attaching to the access network 12, for registering for a service with the service provider network 14.

In an example configuration, the processing circuit 52 is configured to receive a list of external identifiers in response to forwarding the subscription request to the HSS 20 or other node in the access network 12. Here, respective ones of the external identifiers in the list are mapped to respective ones among the plurality of wireless devices 10 that are associated with the service provider network 14. Correspondingly, the processing circuit 52 is configured to forward the list to the service provider network 14, and to (subsequently) forward the attachment notification for a particular one of the wireless devices 10 by forwarding a list pointer or index value that identifies the external identifier of the wireless device 10 within the list.

Also, as earlier noted, the service provider network 14 in one or more example embodiments comprises an MTC network that provides an MTC service. In turn, the wireless device 10 hosts an MTC application that is authorized to communicate with the MTC service according to a defined subscription agreement in which the wireless device 10 is identified by an SCL-ID as the aforementioned service provider network identifier.

In any case, the processing circuit 52 may comprise one or more CPUs or other digital processing circuitry 54 that includes or is associated with one or more computer-readable mediums, such as program and data memory or storage 56. In an example configuration, the storage 56 stores a computer program comprising computer program instructions. The processing circuit 52 is configured to carry out the method 400 based at least partially on its execution of the stored computer program instructions.

The storage 56 also may be used to store at least temporarily information 58 that is received from the HSS 20 and/or from the service provider network 14. For example, the storage 56 may be used to store external identifiers, NAP or NSAPI information, bound tokens, etc., in support of the IWF operations disclosed herein.

Figure 6:
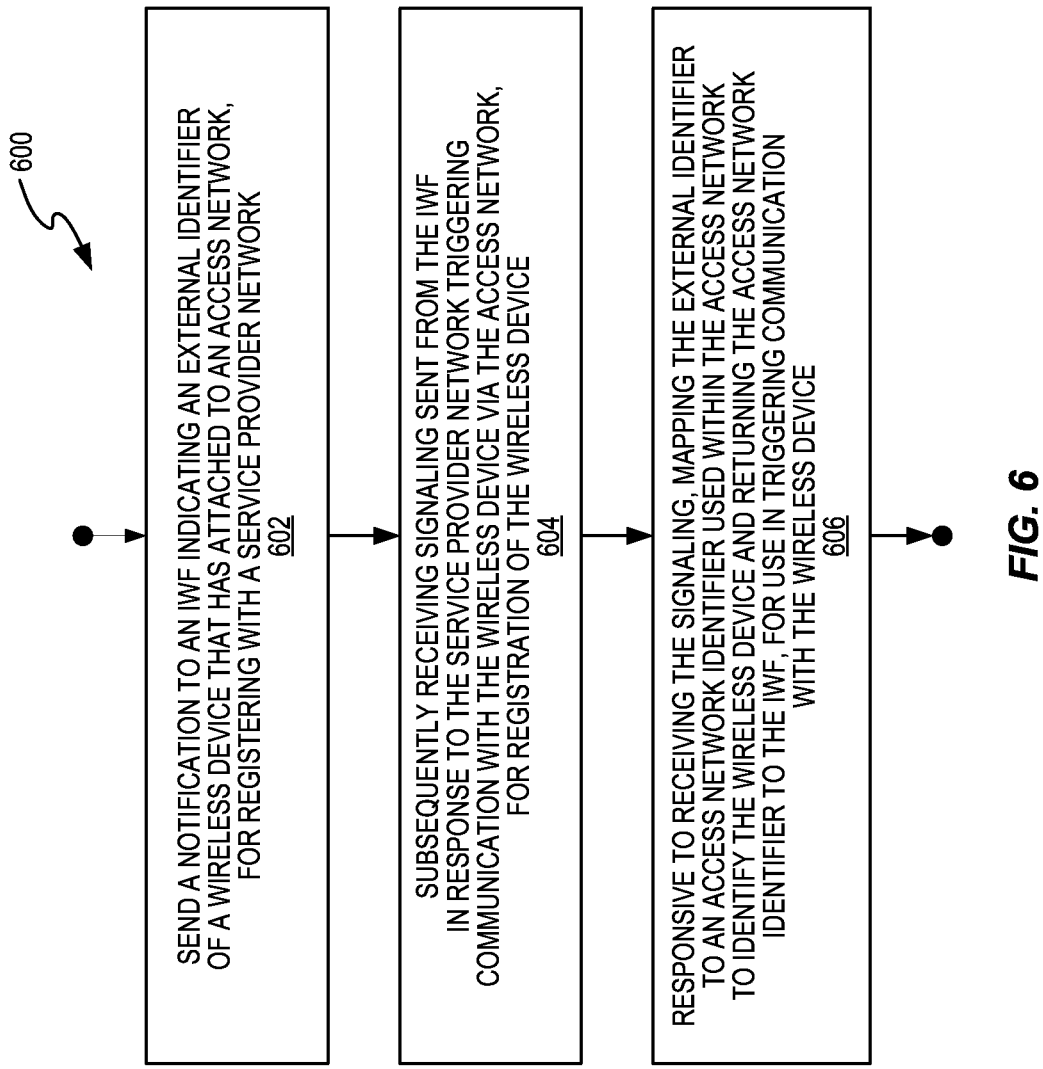
FIG. 6 is a logic flow diagram of one embodiment of a method of processing at an HSS or other node within an access network.

FIG. 6 introduces a method 600, which is implemented at the HSS 20 (or another appropriately configured access network node), and which complements the method 200 implemented by the service provider network node 24, and the method 400 implemented by the IWF in the node 22. The method 600 includes sending (Block 602) a notification to an interworking function that communicatively couples to a service provider network 14, e.g., to the IWF in node 22. As described earlier, the HSS 20 may be configured such that it sends these notifications in dependence on the service provider network node 24 having previously sent a subscription request to the IWF in the node 22, and the IWF sending a corresponding subscription request to the HSS 20.

In any case, the notification indicates the external identifier of a wireless device 10 that has attached to the access network 12, for registering with the service provider network 14. As before, the external identifier is assigned to the wireless device 10 by the access network 12, for use by the service provider network 14 in identifying the wireless device 10 to the access network 12.

The method 600 further includes subsequently receiving (Block 604) signaling sent from the IWF in response to the service provider network 14 triggering communication with the wireless device 10 via the access network 12. That is, the service provider network 14 triggers communication with the wireless device 10, to initiate registration by the wireless device 10 with the service provider network 14.

In response to receiving the signaling from the IWF, the method 600 further includes mapping (Block 606) the external identifier to an access network identifier of the wireless device 10, which is used to identify the wireless device 10 within the access network 12, and returning the access network identifier to the interworking function, for use in triggering the communication with the wireless device 10. In other words, the HSS 20 has or knows the logical binding or association between the IMSI or other such access network identifier used to identify the wireless device 10 within the access network 12, and the external identifier that has been assigned to the wireless device 10 for use by the service provider network 14 in identifying the wireless device 10 to the access network 12. The HSS 20 thus sends return signaling to the IWF, providing the IWF with the access network identifier needed to target the triggering signaling to the wireless device 10.

Figure 7:
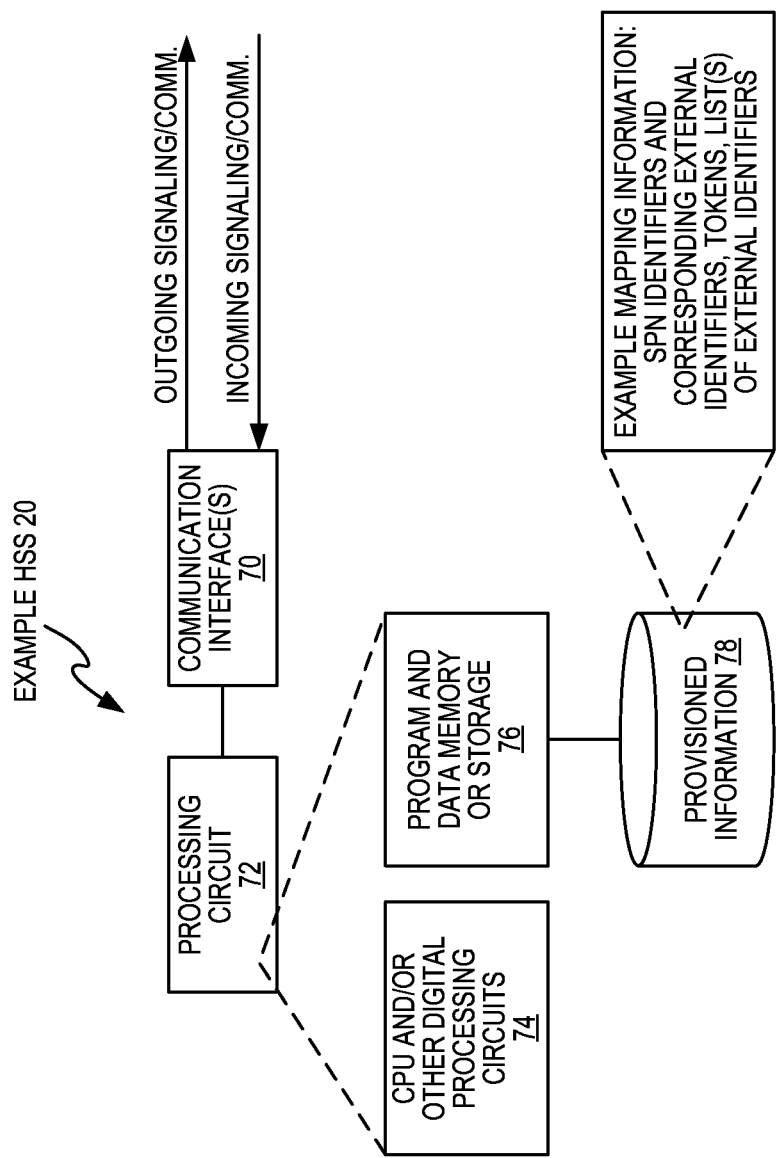
FIG. 7 is a block diagram of one embodiment of an HSS or other node within the access network that is configured to perform the method of FIG. 6, for example.

FIG. 7 introduces an example network node configured as an HSS 20, for implementation of the method 600 and/or variations of that method. In the illustrated example, the HSS 20 comprises a communication interface 70 that is configured to communicate with the IWF 22, which communicatively links the access network 12 of the HSS 20 to the service provider network 14, which is external to the access network 12. It will be understood that the communication interface 70 actually may comprise multiple interfaces, and may interface to more than one physical layer and/or may support a number of signaling protocols and interface types for communicating with multiple types of other nodes.

The HSS 20 further includes a processing circuit 72 that is operatively associated with the communication interface 70 and is configured to send a notification to the IWF 22. The notification indicates the external identifier of a wireless device 10 that has attached to the access network 12 for registering with the service provider network 14. In one or more embodiments, prior to sending such a notification, the HSS 20 is configured to receive a subscription request from the IWF, which the IWF sends in response to receiving a corresponding subscription request from the service provider network 14. In other words, the service provider network 14 first subscribes to such notifications from the access network 12, and that subscription results in the HSS 20 subsequently sending notifications to the service provider network 14 upon attachment to the access network 14 of wireless devices 10 that are associated with the service provider network 14.

The processing circuit 72 is further configured to subsequently receive signaling sent from the IWF 22 in response to the service provider network 14 triggering communication with the wireless device 10 via the access network 12, to prompt the registration of the wireless device 10 with the service provider network 14. The signaling sent from the IWF 22 to the HSS 20 includes the external identifier of the wireless device 10 and can be understood as a query by the IWF 22 for the IMSI or other access network identifier corresponding to the external identifier.

Thus, in response to such signaling from the IWF 22, the processing circuit 72 is configured to map the external identifier received in the signaling to the access network identifier of the wireless device 10, and return the access network identifier to the IWF 22, for use in triggering the communication with the wireless device 10. In at least one such embodiment, the processing circuit 72 is configured to send the notification based upon earlier receiving a subscription request for such notifications from the IWF 22.

In some embodiments, the processing circuit 72 is configured to send a list of external identifiers responsive to the subscription request from the IWF 22. Correspondingly, the notification subsequently sent from the HSS 20 indicates the external identifier of the wireless device 10 by indicating a pointer or index into the list of external identifiers.

Further, in some embodiments, the processing circuit 72 is configured to return an access point name or identifier responsive to the signaling received from the IWF 22, for use by the IWF 22 in including in triggering signaling sent to the wireless device 10. Including this information in the triggering signaling indicates the access point to be used by the wireless device 10 for sending registration signaling toward the service provider network 14.

This information and other data may be provisioned in the HSS 20. For example, the processing circuit 72 comprises one or more CPUs or other digital processing circuitry 74 that includes or is associated with a computer-readable medium, such as program and data memory or other storage 76. The storage 76 holds provisioned information 78.

For example, the storage 76, which may be non-volatile storage, holds information that binds or maps individual external identifiers to respective access network identifiers. More broadly, the provisioned information 78 may comprise information identifying the service provider network 14, information identifying the wireless devices 10 that are associated with the service provider network 14, and information identifying the external identifiers—e.g., a range—to be allocated to individual ones of the wireless devices 10 that are associated with the service provider network 14.

The information identifying the associated wireless devices 10 may comprise the IMSIs or other such access network identifiers of the wireless devices 10, so that individual ones of the wireless devices 10 can be recognized as being associated with the service provider network 14 when they attach to the access network 12. Further, the provisioned information 38 may include an APN or NSAPI values for use by the wireless devices 10 in directing communications toward the service provider network 14. Also, as noted, the provisioned information 78 may comprise a list or range of external identifiers that have been allocated or otherwise predefined for use with the service provider network 14.

In a particular but non-limiting example, the storage 76 is used by the HSS 20 to maintain the following mapping for a given wireless device 10: access network identifier→external identifier→identifier or name for the service provider network 14 and/or APN or NSAPI associated with the service provider network 14. Thus, in at least one embodiment, the HSS 20 is configured to store provisioning information accessible to the processing circuit 72, where the provisioning information includes the access network identifier of the wireless device 10, as mapped to the external identifier assigned to the wireless device 10, and as further mapped to the access point name or identifier and the service provider network 14.

Further, in at least some embodiments, the processing circuit 72 is configured to generate the tokens used according to the teachings herein. Thus, for a given wireless device 10, the processing circuit 72 is configured to generate a token that is bound to the external identifier of the wireless device 10 and to indicate the token in the notification sent to the IWF 22. This allows the IWF 22 to forward the token to the wireless device 10, for later return by the wireless device 10 in registration signaling sent to the service provider network 14. That return enables the service provider network 14 to recognize the token in the registration signaling and bind the service provider network identifier of the wireless device 10, as further received in the registration signaling, to the external identifier of the wireless device 10.

Figure 8:
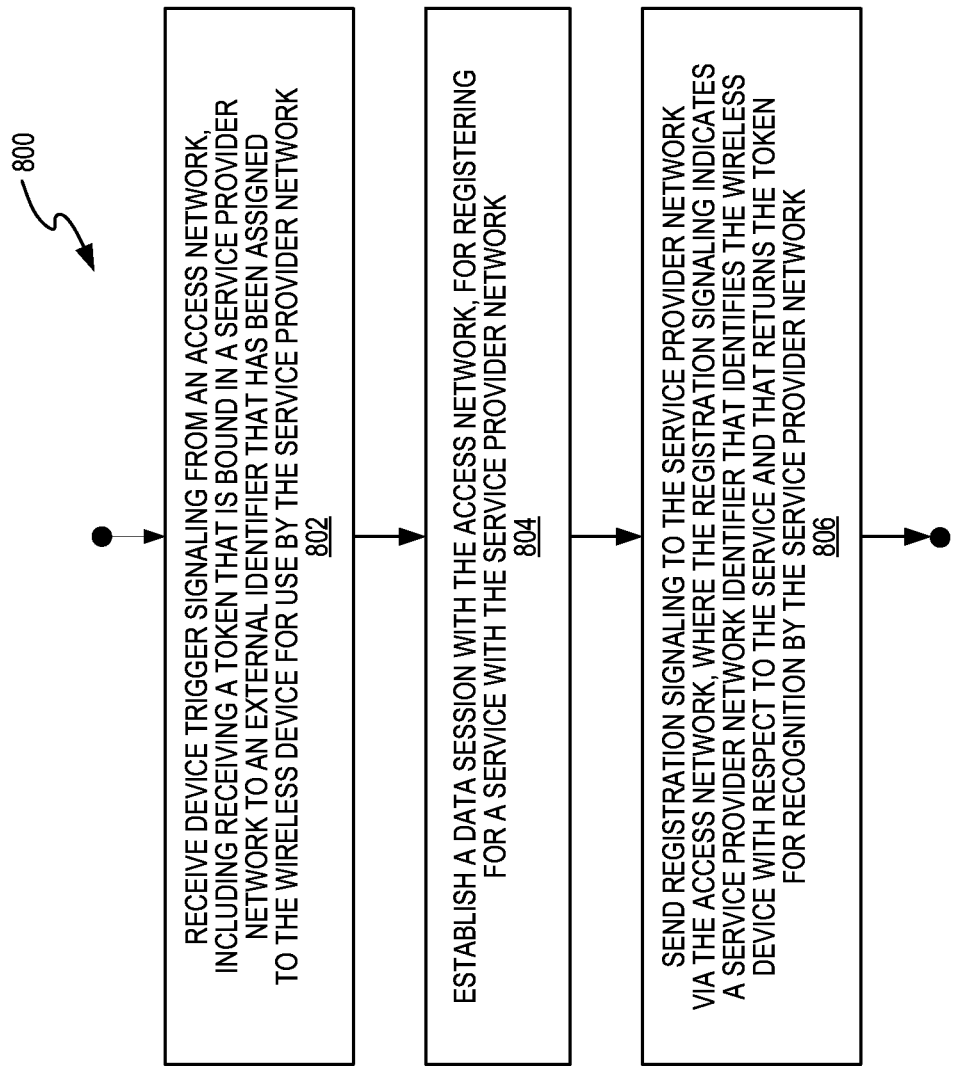
FIG. 8 is a logic flow diagram of one embodiment of a method of processing at a wireless device.

Turning to an example wireless device 10, FIG. 8 illustrates a method 800 performed by any given one of the wireless devices 10. The method 800 includes receiving (Block 802) device trigger signaling from the access network 12 that is directed to the wireless device 10 via an access network identifier used by the access network 12 to identify the wireless device 10 internally within the access network 12. The device trigger signaling includes a token and, as before, the device trigger signaling is sent to the wireless device 10 in response to the access network 12 receiving corresponding trigger signaling from the service provider network 14, in which the targeted wireless device 10 is identified via the external identifier assigned to the wireless device 10 by the access network 12. In some embodiments, the device trigger signaling also includes access point information, e.g., an APN or NSAPI, for use by the wireless device 10 in establishing communication with the service provider network 14.

In response to receiving the device trigger signaling, the method 800 continues with the wireless device 10 establishing (Block 804) a data session with the access network 12, for registering for a service with the service provider network 14, and sending (Block 806) registration signaling to the service provider network 14 via the data session. Advantageously, the registration signaling indicates a service provider network identifier that identifies the wireless device 10 with respect to the service for which the registration signaling is being sent, and such signaling returns the token to the service provider network 14. As explained, the service provider network 14 recognizes the returned token as matching the outgoing token used in the initial triggering signaling sent from the service provider network 14, and the service provider network 14 thereby learns the association between the external identifier bound to that token and the service provider network identifier of the wireless device 10, as sent in the registration signaling from the wireless device 10.

Figure 9:
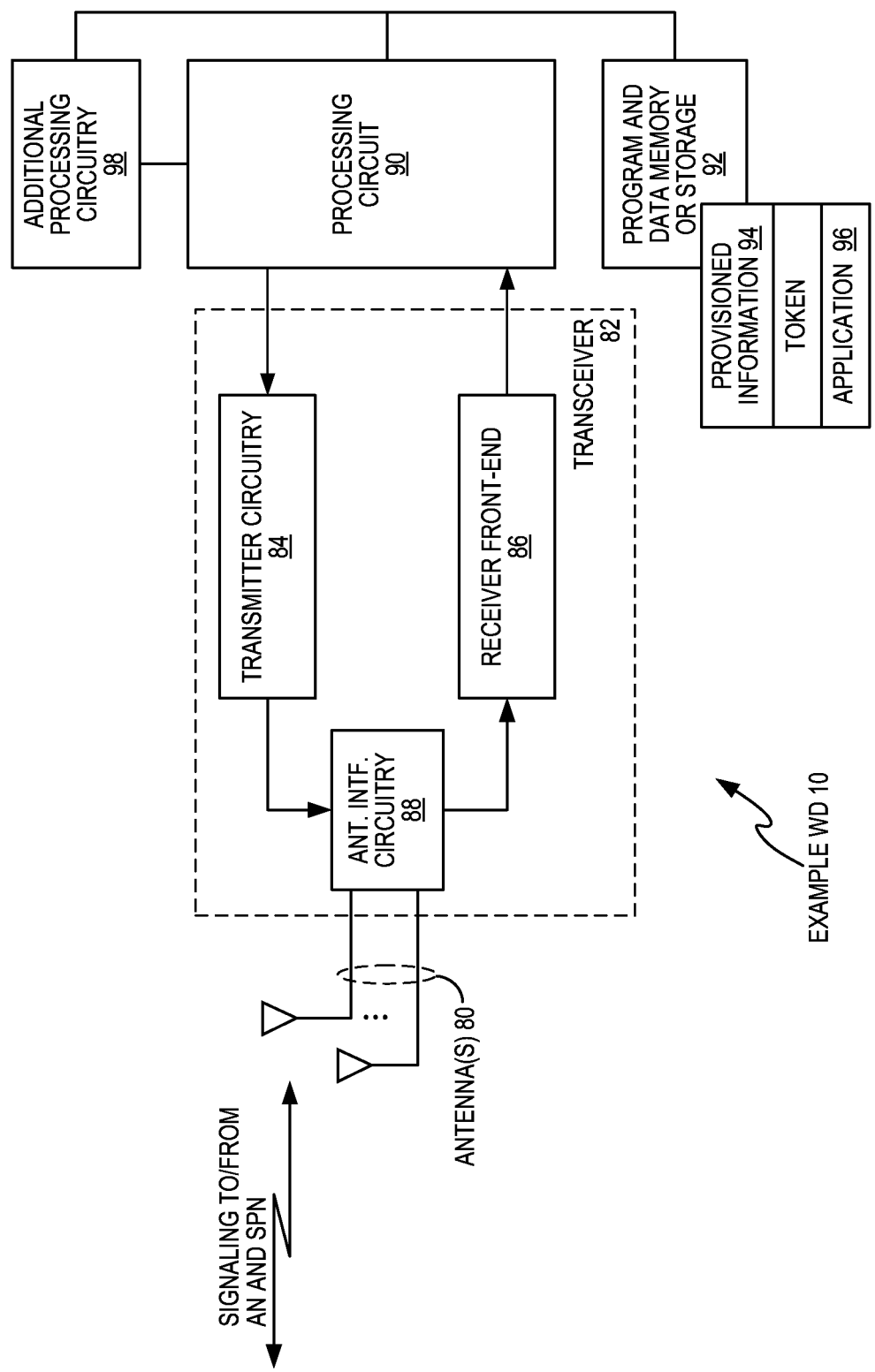
FIG. 9 is a block diagram of one embodiment of a wireless device configured to perform the method of FIG. 8, for example.

An example wireless device 10 that is configured to carry out the method 800 and/or variation of that method is illustrated in FIG. 9. The illustrated wireless device 10 includes a one or more transmit and receive antennas 80 and an associated communication transceiver 82. The communication transceiver 82 includes transmitter circuitry 84, a receiver front-end 86, and antenna interface circuitry 88.

The wireless device 10 further includes one or more processing circuits 90, which include or are associated with program data memory or other such storage 92. The storage 92 includes, for example, provisioned information 94 and an application 96 that uses a service provided by the service provider network 14. In an example case, execution of the application 96 by the processing circuit 90 configures the wireless device 10 for communication with the service provider network 14.

Here, it will be understood that the processing circuit 90 may comprise baseband processing circuits and other supporting circuitry needed for authenticating to the access network 12 and communicating with the access network 12, via the transceiver 82. For example, the transceiver 82 may comprise a cellular radio transceiver configured according to one or more cellular network standards, such as the GSM, WCDMA and/or LTE standards.

Further, while such functionality may be implemented using functionally or physically separate processors, the processing circuit 90 may further include one or more "application processors," which are microprocessors or other digital processing circuitry configured to host/execute the application 96. The additional processing circuitry 98 may supplement such functionality, e.g., by providing user interfaces, I/O circuitry for interfacing with monitoring and/or control systems, etc.

In any case, the transceiver 82, which may be referred to generically as the "communication interface 82," is configured to communicate with the access network 12 and with the service provider network 14, via signaling conveyed through the access network 12. Operations of the processing circuit 90 generally are involved in supporting such communications, e.g., by providing baseband transmit and receive processing, etc.

Of more interest, the processing circuit 90 is operatively associated with the communication interface 82 and configured to: receive device trigger signaling from the access network 12 that is directed to the wireless device 10 via the access network identifier used by the access network 12 to identify the wireless device 10 internally within the access network 12. The device trigger signaling further includes a token and, as before, the device trigger signaling is sent to the wireless device 10 in response to the access network 12 receiving corresponding trigger signaling from the service provider network 14. The trigger signaling from the service provider network 14 identifies the wireless device 10 via an external identifier that is bound to the token in the service provider network 14 and that has been assigned by the access network 12 for use by the service provider network 14 in identifying the wireless device 10 to the access network 12.

The processing circuit 90 is further configured to establish a data session with the access network 12, for registering for a service with the service provider network 14, and to send registration signaling to the service provider network 14 via that data session. Advantageously, the registration signaling indicates the service provider network identifier of the wireless device 10, which identifies the wireless device 10 with respect to the service and returns the token. By returning the token in its registration signaling, the wireless device 10 enables the service provider network 14 to recognize the returned token and thereby bind the service provider network identifier of the wireless device 10 to the external identifier of the wireless device 10.

In some embodiments, the device trigger signaling received by the wireless device 10 indicates an APN or NSAPI and the processing circuit 90 is configured to use the APN or NSAPI for establishing the data session.

In an example configuration, the service provider network 14 is an MTC network, and the application 96 is an MTC application that interacts with an M2M service provided by the MTC network. As such, the processing circuit 90 is configured to perform the registration for the service as an M2M SCL registration with the MTC network.

Figure 10:
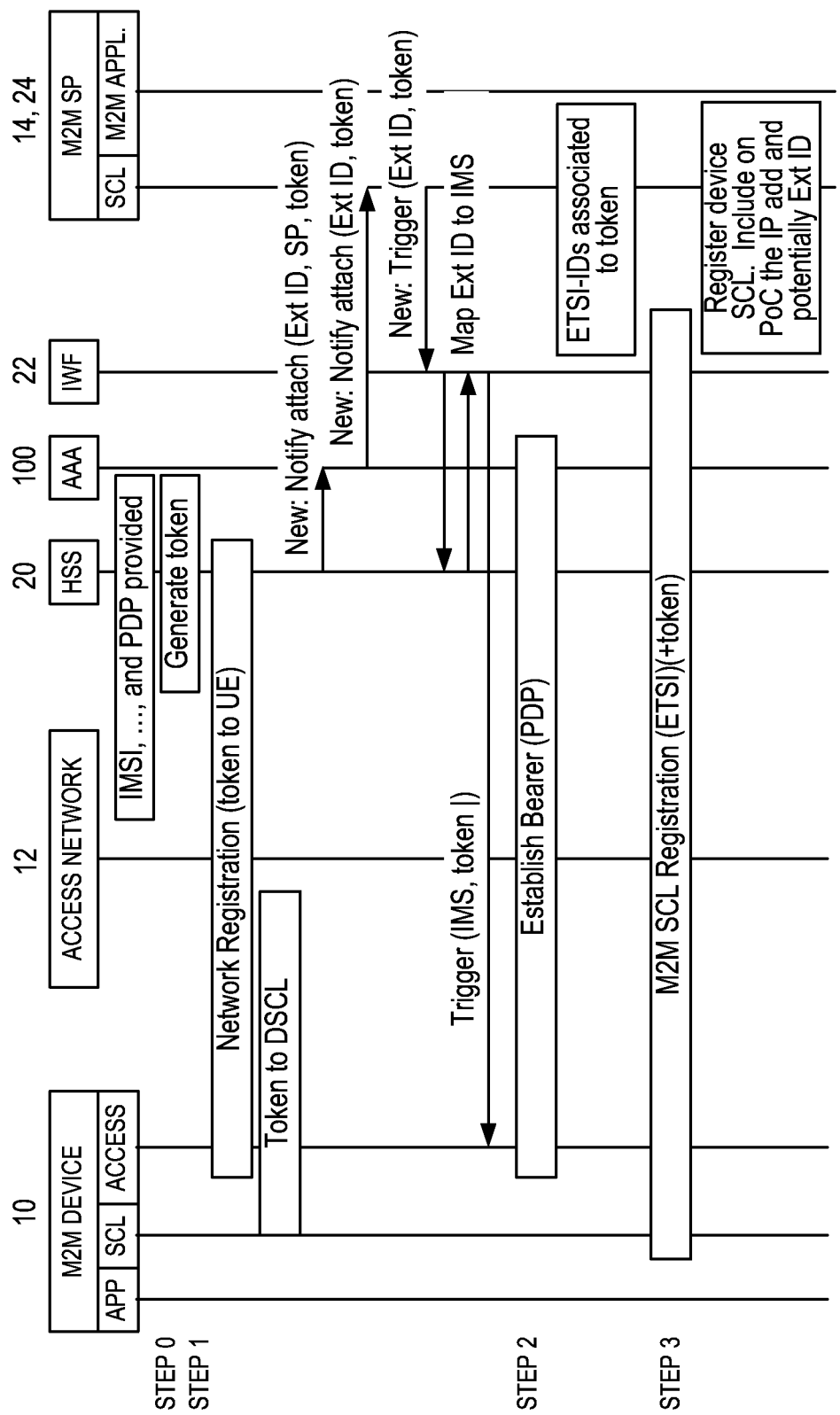
FIG. 10 is a signal flow diagram of an overall set of signaling between a service provider network node, an IWF node, an HSS node, and a wireless device, according to one embodiment of the teachings herein.

FIG. 10 illustrates one embodiment for the overall signal flow in such an embodiment. One will note the inclusion of an Access/Authorization/Accounting (AAA) server 100, for completeness, and one will further note that that representation of the service provider network 14 has been consolidated with the service provider network node 24.

At step 0, the HSS 20 generates a token to be used for correlation with the external identifier that has been or will be assigned to a given wireless device 10. A step 1, the token is forwarded to the wireless device 10 during an access network registration. Internally, within the wireless device 10, the token is provided to the Device SCL (DSCL), as implemented in or represented by the application 96. Of course, it is contemplated herein that the forwarding of the token to the wireless device 10 may be accomplished by other means, e.g. after the access network registration—e.g., as part of establishing the data session, which may comprise establishment of a bearer sent from AAA to the wireless device 10 via an access gateway. A Network Access Stratum (NAS) Protocol Configuration Option (PCO) Information Element (IE) may be used to accomplish this, for example. See the technical specification identified as 3GPP TS 24.008 for further details.

The token is also forwarded to the M2M Service Provider (SP) SCL via the AAA 100 and IWF 22. The token is sent in conjunction with the external identifier assigned to the wireless device 10. At some later time, the M2M SP—as represented by the service provider network 14 and node 24—communicates with the IWF 22, to wake up the wireless device 10 and includes the external identifier the token bound to it in such signaling.

Thus, in step 2, the wireless device 10 establishes a data session with the access network 12. For example, the wireless device 10 establishes an access network bearer, such as a PDN connection according to 3GPP TS 24.301. Similar operations apply to other types of access networks 12, such as in an LTE-based access network.

In step 3, the DSCL of the wireless device 10 registers with the M2M SP using existing ETSI procedures, which are extended in the sense that the DSCL returns the token to the M2M SP as part of sending such registration signaling.

Correspondingly, the NSCL at the M2M SP associates the external identifier of the wireless device 10 with the DSCL, based on recognizing the returned token, and includes as part of the DSCL Point of Contact (PoC) the IP address of the wireless device 10 and, optionally, the external identifier. In an example embodiment, the NSCL uses recognition of the token to trigger a binding between the external identifier of the wireless device and the DSCL-ID of the wireless device 10, as learned from the ETSI registration procedures.

Figure 11A:
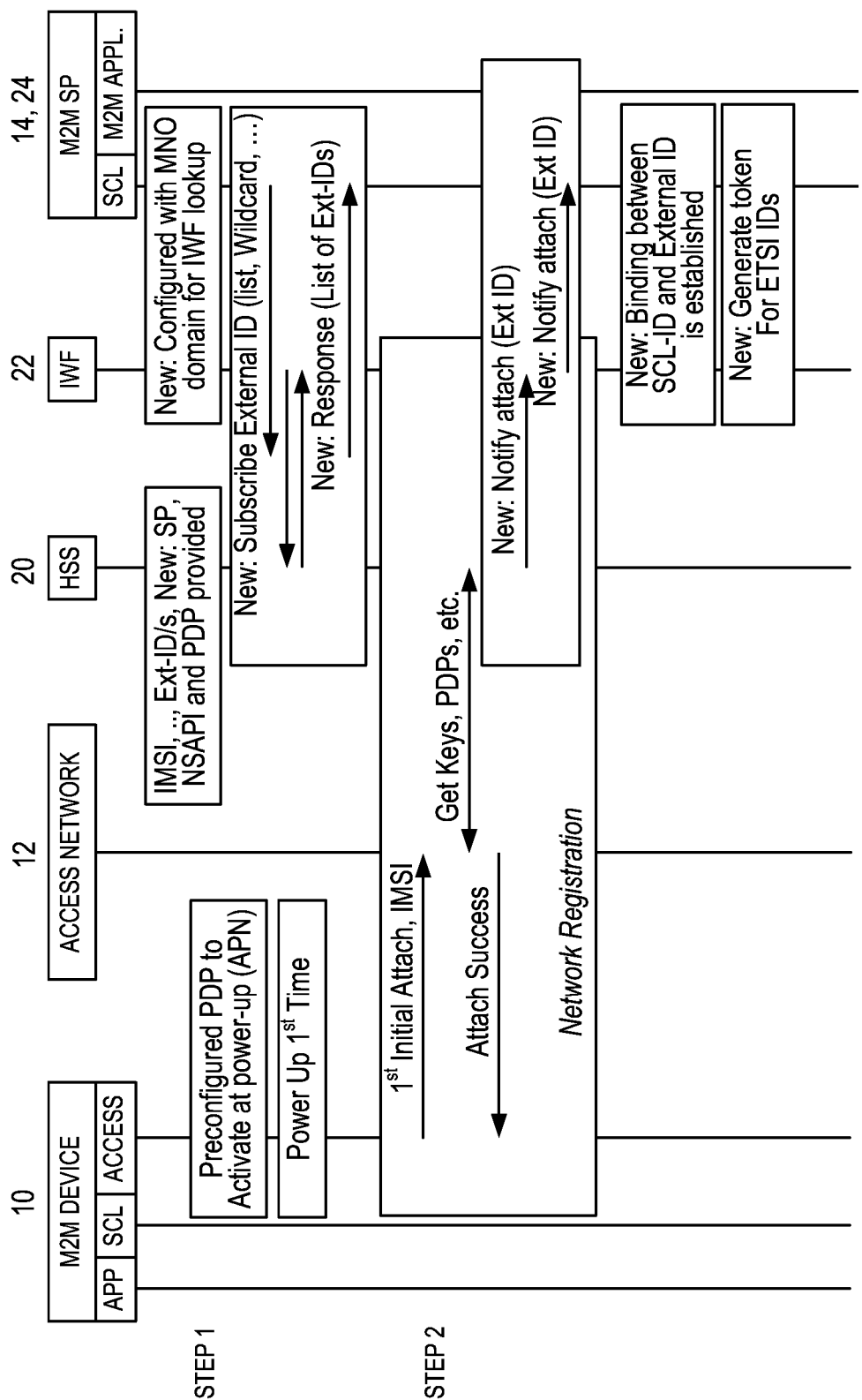
FIGS. 11A and 11B illustrate a signal flow diagram of an overall set of signaling between a service provider network node, an IWF node, an HSS node, and a wireless device, according to another embodiment of the teachings herein.
Figure 11B:
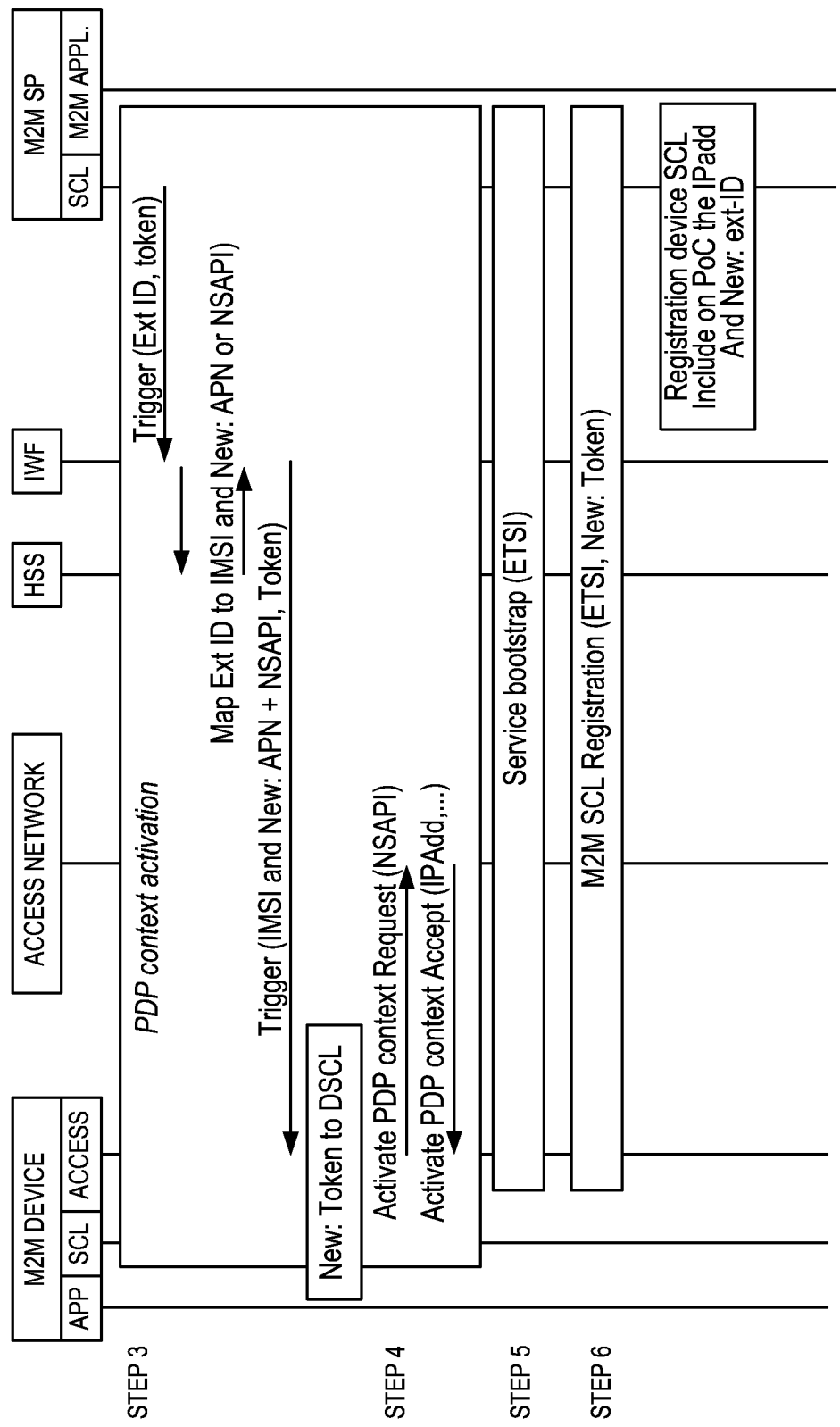

FIG. 11 illustrates yet another embodiment of an overall signaling flow. As with the signaling flow in FIG. 10, the scenario illustrated in FIG. 11 uses a token to allow the service provider network 14 to automatically learn the association between the service provider network identifier of a given wireless device 10 and the external identifier assigned to that wireless device 10 by the access network 12. However, FIG. 11 illustrates a number of alternatives with respect to the signal flow of FIG. 10.

For example, in FIG. 10, the access network 12 generated the token. In FIG. 11, the service provider network 14 generates the token. Further, in FIG. 10 it may be assumed that the wireless device 10 already knows the identity to use for accessing the service provider network 14, for purposes of sending registration signaling. FIG. 11 adds flexibility by providing access point name or identification information to the wireless device 10, thereby identifying the particular service provider network 14 to which the wireless device 10 should direct its registration signaling. Such operations are useful in cases where one wireless device 10 hosts multiple applications 96 that are associated with different services and possibly with different service provider networks 14 (or at least with different NSCLs in the M2M case).

Note that the HSS 20 is presumed to incorporate the AAA (radius) functionality, to simplify the call flow. With that in mind, in step 1, at power on, the M2M NSCL subscribes to the IWF 22 belonging to the access network 12 in question, requesting that the M2M NSCL be notified of the external identifier allocated to an M2M device—e.g., a wireless device 10 hosting an MTC application 96—when the M2M device successfully attaches to the access network 12.

In step 2, the access part of the M2M device is authenticated by the access network 12, for network access. Once successfully authenticated, the M2M device access profile is downloaded in the access network 12 for enforcement purposes. Further, after successful authentication of the M2M device, the IWF 22 shall be notified, through the HSS 20, of the external identifier allocated to the authenticated M2M device. In turn, the IWF 22 notifies the M2M NSCL that an M2M device is attached to the access network 12 and the M2M NSCL acquires the external identifier allocated to the M2M device via this notification.

At this stage, the M2M NSCL does not know the D/GSCL ID corresponding to the external identifier. Thus, to acquire the D/GSCL associated with the external identifier just received from the IWF 22, in step 3 the M2M NSCL creates a token and binds it to the external identifier.

Subsequent to that binding, the M2M NSCL initiates a device trigger to the D/GSCL of the M2M device by sending the external identifier and the token to the IWF 22. The IWF 22 queries the HSS 20 using the external identifier and receives the corresponding IMSI bound to the external ID, and the APN or NSAPI that the M2M device has to use when it initiates a PDP context, or otherwise establishes a data session with the access network 12. The IWF 22 then initiates a device trigger toward the M2M device, which includes sending the token and the APN or NSAPI to the M2M device, as targeted by the IMSI retrieved from the HSS 20.

In step 4, the M2M device has been awakened by the device trigger signaling from the IWF 22 and has thereby received the token and the APN to use. The M2M device acquires an IP address from the access network 12 and then establishes a data session according to the received APN.

In step 5, the D/GSCL implemented at the M2M device performs a service bootstrap with the M2M SP using existing ETSI procedures and in step 6 the D/GSCL registers with the M2M SP using existing ETSI procedures. However, according to the teachings herein, these procedures are enhanced, to pass the token during SCL registration. Thus, M2M NSCL uses the token received in the M2M registration procedures to locate the external identifier that is bound to the received token, and thereby is able to bind the received G/DSCL ID for the M2M device to the external identifier. The M2M NSCL can then store all such information within the M2M PoC resource maintained for the M2M device in the M2M network.

Thus, the various embodiments detailed by way of example in the foregoing discussion can be understood as providing an advantageous "auto-provisioning" procedure that enables an external service provider network to learn the association between external identifiers and service provider network identifiers.

The procedure in example form includes or otherwise involves: the provisioning or assigning of external identifiers to wireless devices in the access network 12, the propagation of external identifiers to the service provider network 14, the generation or association of individual tokens to respective ones of the external identifiers, the use of individual external identifiers to wake up the corresponding wireless devices 10, providing the associated tokens to such wireless devices 10 in the wake-up triggering, receiving individual tokens from the respective ones of the wireless devices 10 in response to waking them up, matching the tokens returned from the wireless devices 10 in registration signaling to their associated external identifiers and binding the service provider network identifiers of the wireless devices (as learned from the registration signaling) to their corresponding external identifiers. This binding thus links the service provider network identifier used by the service provider network 14 for a given wireless device 10 with the external identifier assigned to the wireless device 10 by the access network 12, thus enabling the service provider network 14 to direct subsequent communications involving the service provider network identifier to the correct wireless device 10, via the bound external identifier.

One scenario in which these teachings are of particular use is that in which the access network 12 has not provisioned the external service provider network 14 with the external identifiers allocated to the device subscriptions for a plurality of wireless devices 10, or not provisioned the wireless devices 10 for that matter. In general these teachings may be used to retrieve the access network identifier of a given wireless device 10 that has a subscription with an external service provider network 14, without having to share that access network identifier with the external network. Further, these teachings provide a mechanism by which the external service provider network 14 can establish a connection between a given wireless device 10 and the external service provider network 14 and associate the service provider network identifier of the wireless device 10 with the IP address of the wireless device 10.

Of course, these teachings can be applied to other than wireless devices 10 and these teachings have particular advantages in the context of M2M devices, where a large plurality of M2M devices must attach to an access network for registering for an M2M service provided by an M2M service provider. Once a given M2M device successfully attaches to an access network 12, its external identifier is passed to the M2M NSCL. The M2M NSCL creates (or receives) a token and binds the token to the received external identifier.

At this point, the M2M NSCL can initiate a device trigger procedure with the IWF that links it to the access network through which the M2M device will connect. The M2M NSCL passes the external identifier and the token in the device trigger signaling. In turn, the IWF receives such signaling and uses the external identifier to query an HSS and retrieve the IMSI associated with the M2M device, possibly along with other information, such as the APN or NSAPI that the M2M device should use. The IWF then initiates a device awakening procedure by passing the token and the APN or NSAPI to the M2M device. The M2M device thus receives the token, acquires a bearer and performs SCL registration by passing the token to the M2M NSCL. The M2M NSCL uses the returned token to locate the external identifier bound to the token, and then binds the external identifier to the G/DSCL ID of the M2M device.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a network node associated with a service provider network that is external to an access network, said method comprising:
 receiving an external identifier that has been assigned by an access network for externally identifying a wireless device that also has a predefined service provider network identifier for using a service provided by the service provider network;
 triggering the wireless device to establish a data session with the access network for use in registering for the service with the service provider network, based on sending triggering signaling toward the access network that identifies the wireless device via the external identifier and includes a token for forwarding to the wireless device;
 receiving registration signaling sent from the wireless device via the access network, said registration signaling sent responsive to the triggering signaling sent from the service provider network; and
 responsive to recognizing that the registration signaling includes the forwarded token, binding the external identifier of the wireless device to the service provider network identifier of the wireless device, to thereby establish a mapping between the external identifier and the service provider network identifier, for subsequent use by the service provider network in triggering communications with the wireless device through the access network.

2. The method of claim 1, wherein receiving the external identifier comprises receiving a notification that indicates the external identifier and indicates that the wireless device has attached to the access network.

3. The method of claim 2, further comprising receiving a list of external identifiers in advance of receiving the notification and wherein the notification includes an index or pointer that identifies the external identifier from among the external identifiers in the list.

4. The method of claim 2, further comprising receiving the token in the notification from the access network, along with the external identifier.

5. The method of claim 2, further comprising generating the token responsive to receiving the notification from the access network, and binding the token to the external identifier.

6. The method of claim 2, further comprising receiving the notification responsive to previously sending a notification subscription request to the access network.

7. The method of claim 1, further comprising:
subsequently identifying the wireless device for a communication related to the service, based on the service provider network identifier;
mapping the service provider network identifier to the external identifier, as bound to the service provider network identifier; and
sending the communication toward the wireless device via the access network, said communication using the external identifier to identify the wireless device to the access network.

8. The method of claim 1, further comprising identifying the access network from provisioned information stored in the network node.

9. The method of claim 1, wherein the service provider network comprises a Machine Type Communications (MTC) network, the service comprises a MTC service, the wireless device hosts an MTC application and is authorized to communicate with the MTC service according to a defined subscription agreement, according to which the wireless device is identified by a Services Capability Layer (SCL) identity as said service provider network identifier, and wherein performing the method binds the external identifier to the SCL identity of the wireless device.

10. The method of claim 9, further comprising receiving a Device/Gateway Services Capability Layer identity (G/DSCL-ID) in the registration signaling, and binding the external identifier to the G/DSCL-ID for directing MTC service communications to the wireless device via the access network.

11. A network node comprising:
a communication interface configured to send signaling to and receive signaling from an access network; and
a processing circuit configured to:
receive an external identifier that has been assigned by the access network for externally identifying a wireless device that also has a predefined service provider network identifier for using a service provided by the service provider network;
trigger the wireless device to establish a data session with the access network for use in registering for the service with the service provider network, based on sending triggering signaling toward the access network that identifies the wireless device via the external identifier and includes a token for forwarding to the wireless device;
receive registration signaling sent from the wireless device via the access network, said registration signaling sent responsive to the triggering signaling sent from the service provider network; and
responsive to recognizing that the registration signaling includes the forwarded token, bind the external identifier of the wireless device to the service provider network identifier of the wireless device, to thereby establish a mapping between the external identifier and the service provider network identifier, for subsequent use by the service provider network in triggering communications with the wireless device through the access network.

12. The network node of claim 11, wherein the processing circuit is configured to receive a notification from the access network that indicates the external identifier and indicates that the wireless device has attached to the access network.

13. The network node of claim 12, wherein the processing circuit is configured to receive a list of external identifiers in advance of receiving the notification and wherein the notification includes an index or pointer that identifies the external identifier from among the external identifiers in the list.

14. The network node of claim 12, wherein the processing circuit is configured to receive the token in the notification from the access network, along with the external identifier.

15. The network node of claim 12, wherein the processing circuit is configured to generate the token responsive to receiving the notification from the access network, and is further configured to bind the token to the external identifier.

16. The network node of claim 11, wherein the processing circuit is configured to:
subsequently identify the wireless device for a communication related to the service, based on the service provider network identifier;
map the service provider network identifier to the external identifier, as bound to the service provider network identifier; and
send the communication toward the wireless device via the access network, said communication using the external identifier to identify the wireless device to the access network.

17. The network node of claim 11, wherein the processing circuit is configured to identify the access network from provisioned information stored in the network node.

18. The network node of claim 11, wherein the service provider network comprises a Machine Type Communications (MTC) network, the service comprises a MTC service, the wireless device hosts an MTC application and is authorized to communicate with the MTC service according to a defined subscription agreement, according to which the wireless device is identified by a Services Capability Layer (SCL) identity as said service provider network identifier, and wherein the processing circuit is configured to bind the external identifier to the SCL identity of the wireless device.

19. The network node of claim 18, wherein the processing circuit is configured to receive a Device/Gateway Services Capability Layer identity (G/DSCL-ID) in the registration signaling, and binding the external identifier to the G/DSCL-ID for directing MTC service communications to the wireless device via the access network.

20. A method at a network node that communicatively couples an access network and a service provider network that is external to the access network, said method comprising:

receiving an external identifier and an associated token in first triggering signaling sent from the service provider network to the network node, to trigger communication with a wireless device as identified by the external identifier;

obtaining an access network identifier for the wireless device from the access network, based on submitting the external identifier to a Home Subscriber Server (HSS) or other node in the access network having access to a defined mapping between the external identifier of the wireless device and the access network identifier of the wireless device; and sending second triggering signaling toward the wireless device via the access network to trigger the wireless device to establish a data session with the access network for sending registration signaling to the service provider network, said second triggering signaling using the access network identifier to identify the wireless device and including the token, to thereby enable the wireless device to return the token to the service provider network in the registration signaling, for recognition by the service provider network as matching the token sent in the first triggering signaling.

21. The method of claim 20, further comprising receiving an access point name or identifier for the service provider network in conjunction with obtaining the access network identifier for the wireless device, and sending an indication of the access point name or identifier in the second triggering signaling, for use by the wireless device in sending the registration signaling.

22. The method of claim 20, wherein submitting the external identifier to the HSS or other node in the access network comprises sending a request to the HSS or other node that includes external identifier, and receiving the access network identifier for the wireless device in return from the HSS or other node, based on a defined mapping between the external identifier and the access network identifier known at the HSS or other node.

23. The method of claim 20, further comprising:
receiving a notification from the HSS or other node in the access network that indicates the external identifier of the wireless device and that is sent in response to the wireless device attaching to the access network, for establishing a data session to send the registration signaling;
forwarding the notification toward the service provider network; and
receiving the first triggering signaling from the service provider network in response to said forwarding of the notification.

24. The method of claim 23, further comprising receiving the token in the notification sent from the HSS or other node in the access network, and including the token in the forwarded notification sent to the service provider network.

25. The method of claim 20, further comprising receiving a subscription request from the service provider network requesting that notifications be provided to the service provider network responsive to any one among a plurality of wireless devices attaching to the access network for registering with the service provider network, and forwarding the subscription request to the HSS or other node in the access network to configure the HSS or other node in the access network to send the notification upon attachment by the wireless device, which is among the plurality of wireless device.

26. The method of claim 25, further comprising receiving a list of external identifiers in response to forwarding the subscription request to the HSS or other node in the access network, wherein respective ones of the external identifiers in the list are mapped to respective ones among the plurality of wireless devices, and forwarding the list to the service provider network, and wherein forwarding the attachment notification comprises forwarding a list pointer or index value that identifies the external identifier of the wireless device within the list.

27. The method of claim 20, wherein the service provider network comprises a Machine Type Communications (MTC) network, and the wireless device hosts an MTC application that is authorized to communicate with the MTC service according to a defined subscription agreement in which the wireless device is identified by a Services Capability Layer (SCL) identity as said service provider network identifier.

28. A network node configured to implement an Inter-Working Function (IWF) between an access network and a service provider network, said network node comprising:
a communication interface configured to send signaling toward and to receive signaling from one or more nodes within an access network, and to send signaling toward and to receive signaling from one or more nodes within a service provider network; and
a processing circuit operatively associated with the communication interface and configured to:
receive an external identifier and an associated token in first triggering signaling sent from the service provider network to the network node, to trigger communication with a wireless device as identified by the external identifier;
obtain an access network identifier for the wireless device from the access network, based on submitting the external identifier to a Home Subscriber Server (HSS) or other node in the access network having access to a defined mapping between the external identifier of the wireless device and the access network identifier of the wireless device; and
send second triggering signaling toward the wireless device via the access network to trigger the wireless device to establish a data session with the access network for sending registration signaling to the service provider network, said second triggering signaling using the access network identifier to identify the wireless device and including the token, to thereby enable the wireless device to return the token to the service provider network in the registration signaling, for recognition by the service provider network as matching the token sent in the first triggering signaling.

29. The network node of claim 28, wherein the processing circuit is configured to receive an access point name or identifier for the service provider network in conjunction with obtaining the access network identifier for the wireless device, and send an indication of the access point name or identifier in the second triggering signaling, for use by the wireless device in sending the registration signaling.

30. The method network node of claim 28, wherein the processing circuit is configured to submit the external identifier to the HSS or other node in the access network by sending a request to the HSS or other node that includes external identifier, and to receive the access network identifier for the wireless device in return from the HSS or other node, based on a defined mapping between the external identifier and the access network identifier known at the HSS or other node.

31. The network node of claim 28, wherein the processing circuit is further configured to:

receive a notification from the HSS or other node in the access network that indicates the external identifier of the wireless device and that is sent in response to the wireless device attaching to the access network, for establishing a data session to send the registration signaling;

forward the notification toward the service provider network; and receive the first triggering signaling from the service provider network in response to said forwarding of the notification.

32. The network node of claim 31, wherein the processing circuit is configured to receive the token in the notification sent from the HSS or other node in the access network, and include the token in the forwarded notification sent to the service provider network.

33. The network node of claim 28, wherein the processing circuit is configured to receive a subscription request from the service provider network requesting that notifications be provided to the service provider network responsive to any one among a plurality of wireless devices attaching to the access network for registering with the service provider network, and forward the subscription request to the HSS or other node in the access network to configure the HSS or other node in the access network to send the notification upon attachment by the wireless device, which is among the plurality of wireless device.

34. The network node of claim 33, wherein the processing circuit is configured to receive a list of external identifiers in response to forwarding the subscription request to the HSS or other node in the access network, wherein respective ones of the external identifiers in the list are mapped to respective ones among the plurality of wireless devices, and to forward the list to the service provider network, and to forward the attachment notification by forwarding a list pointer or index value that identifies the external identifier of the wireless device within the list.

35. The network node of claim 28, wherein the service provider network comprises a Machine Type Communications (MTC) network, and the wireless device hosts an MTC application that is authorized to communicate with the MTC service according to a defined subscription agreement in which the wireless device is identified by a Services Capability Layer (SCL) identity as said service provider network identifier.

36. A method in a network node configured as a Home Subscriber Server (HSS) in an access network, said method comprising:

sending a notification to an interworking function that communicatively couples to a service provider network, said notification indicating an external identifier of a wireless device that has attached to the access network, for registering with the service provider network, said external identifier assigned to the wireless device by the access network, for use by the service provider network in identifying the wireless device to the access network;

subsequently receiving signaling sent from the interworking function responsive to the service provider network triggering communication with the wireless device via the access network, for registration of the wireless device, said signaling including the external identifier of the wireless device; and responsive to said signaling, mapping the external identifier to an access network identifier of the wireless device, which is used to identify the wireless device within the access network, and returning the access network identifier to the interworking function, for use in triggering the communication with the wireless device.

37. The method of claim 36, further comprising sending the notification based upon earlier receiving a subscription request for such notifications from the interworking function.

38. The method of claim 37, further comprising sending a list of external identifiers responsive to the subscription request, and wherein the notification indicates the external identifier of the wireless device by indicating a pointer or index into the list of external identifiers.

39. The method of claim 36, further comprising returning an access point name or identifier responsive to said signaling, for including in triggering signaling sent to the wireless device, to indicate an access point to be used by the wireless device for sending registration signaling toward the service provider network.

40. The method of claim 39, further comprising storing provisioning information in the node that includes the access network identifier of the wireless device mapped to the external identifier assigned to the wireless device, and further mapped to the access point name or identifier and the service provider network.

41. The method of claim 36, further comprising generating a token that is bound to the external identifier of the wireless device and indicating the token in the notification sent to the interworking function, for forwarding to and later return by the wireless device in registration signaling sent to the service provider network, thereby enabling the service provider network to recognize the token in the registration signaling and bind a service provider network identifier of the wireless device, as further received in the registration signaling, to the external identifier of the wireless device.

42. A network node configured as a Home Subscriber Server (HSS) in an access network, said network node comprising:

a communication interface configured to communicate with an interworking function that communicatively links the access network to a service provider network that is external to the access network;

a processing circuit that is operatively associated with the communication interface and is configured to:

send a notification to the interworking function, said notification indicating an external identifier of a wireless device that has attached to the access network, for registering with the service provider network, and said external identifier assigned to the wireless device by the access network, for use by the service provider network in identifying the wireless device to the access network;

subsequently receive signaling sent from the interworking function responsive to the service provider network triggering communication with the wireless device via the access network, for registration of the wireless device, said signaling including the external identifier of the wireless device; and responsive to said signaling, map the external identifier to an access network identifier of the wireless device, which is used to identify the wireless device within the access network, and return the access network identifier to the interworking function, for use in triggering the communication with the wireless device.

43. The network node of claim 42, wherein the processing circuit is configured to send the notification based upon earlier receiving a subscription request for such notifications from the interworking function.

44. The network node of claim 43, wherein the processing circuit is configured to send a list of external identifiers responsive to the subscription request, and wherein the notification indicates the external identifier of the wireless device by indicating a pointer or index into the list of external identifiers.

45. The network node of claim 42, wherein the processing circuit is configured to return an access point name or identifier responsive to said signaling, for including in triggering signaling sent to the wireless device, to indicate an access point to be used by the wireless device for sending registration signaling toward the service provider network.

46. The network node of claim 45, wherein the network node is configured to store provisioning information accessible to the processing circuit, said provisioning information including the access network identifier of the wireless device mapped to the external identifier assigned to the wireless device, and further mapped to the access point name or identifier and the service provider network.

47. The network node of claim 42, wherein the processing circuit is configured to generate a token that is bound to the external identifier of the wireless device and indicate the token in the notification sent to the interworking function, for forwarding to and later return by the wireless device in registration signaling sent to the service provider network, thereby enabling the service provider network to recognize the token in the registration signaling and bind a service provider network identifier of the wireless device, as further received in the registration signaling, to the external identifier of the wireless device.

48. A method in a wireless device that is configured to communicate with a service provider network via an access network, said method comprising:
   receiving device trigger signaling from the access network that is directed to the wireless device via an access network identifier used by the access network to identify the wireless device internally within the access network and that includes a token, said device trigger signaling sent to the wireless device in response to the access network receiving corresponding trigger signaling from the service provider network that identifies the wireless device via an external identifier that is bound to the token in the service provider network and that has been assigned by the access network for use by the service provider network in identifying the wireless device to the access network;
   establishing a data session with the access network, for registering for a service with the service provider network; and
   sending registration signaling to the service provider network via the data session, said registration signaling indicating a service provider network identifier that identifies the wireless device with respect to the service and returning the token, thereby enabling the service provider network to recognize the returned token and thereby bind the service provider network identifier of the wireless device to the external identifier of the wireless device.

49. The method of claim 48, wherein the device trigger signaling received by the wireless device indicates an Access Point Name (APN) or Network Service Access Point Identifier (NSAPI) to be used by the wireless device for establishing the data session, for registering for the service with the service provider network.

50. The method of claim 48, wherein the service provider network is a Machine Type Communications (MTC) network, wherein the wireless device hosts a MTC application that interacts with a service provided by the MTC network, and wherein the method includes registering for the service by a Machine-to-Machine (M2M) Services Capability Layer (SCL) registration with the MTC network.

51. A wireless device comprising:
   a communication interface configured to communicate with an access network and with a service provider network, via signaling conveyed through the access network; and a processing circuit operatively associated with the communication interface and configured to:
   receive device trigger signaling from the access network that is directed to the wireless device via an access network identifier used by the access network to identify the wireless device internally within the access network and that includes a token, said device trigger signaling sent to the wireless device in response to the access network receiving corresponding trigger signaling from the service provider network that identifies the wireless device via an external identifier that is bound to the token in the service provider network and that has been assigned by the access network for use by the service provider network in identifying the wireless device to the access network;
   establish a data session with the access network, for registering for a service with the service provider network; and
   send registration signaling to the service provider network via the data session, said registration signaling indicating a service provider network identifier that identifies the wireless device with respect to the service and returning the token, thereby enabling the service provider network to recognize the returned token and thereby bind the service provider network identifier of the wireless device to the external identifier of the wireless device.

52. The wireless device of claim 51, wherein the device trigger signaling received by the wireless device indicates an Access Point Name (APN) or Network Service Access Point Identifier (NSAPI) and wherein the processing circuit is configured to use APN or NSAPI for establishing the data session, for registering for the service with the service provider network.

53. The wireless device of claim 51, wherein the service provider network is a Machine Type Communications (MTC) network, wherein the wireless device hosts a MTC application that interacts with a service provided by the MTC network, and wherein the processing circuit is configured to perform as said registration a Machine-to-Machine (M2M) Services Capability Layer (SCL) registration with the MTC network.

* * * * *